(12) United States Patent
Walter

(10) Patent No.: US 9,114,844 B2
(45) Date of Patent: Aug. 25, 2015

(54) BICYCLE CONVERSION KIT AND TRICYCLE APPARATUS

(71) Applicant: Hauler Cycles, LLC, Traverse City, MI (US)

(72) Inventor: Christopher J. Walter, Traverse City, MI (US)

(73) Assignee: Hauler Cycles, LLC, Traverse City, MI (US)

( * ) Notice: Subject to any disclaimer, the term of this patent is extended or adjusted under 35 U.S.C. 154(b) by 0 days.

(21) Appl. No.: 14/044,216

(22) Filed: Oct. 2, 2013

(65) Prior Publication Data

US 2014/0091551 A1 Apr. 3, 2014

Related U.S. Application Data

(60) Provisional application No. 61/709,336, filed on Oct. 3, 2012.

(51) Int. Cl.
| | |
|---|---|
| *B62K 5/08* | (2006.01) |
| *B62K 13/04* | (2006.01) |
| *B62K 5/05* | (2013.01) |
| *B62K 7/04* | (2006.01) |

(52) U.S. Cl.
CPC . *B62K 13/04* (2013.01); *B62K 5/05* (2013.01); *B62K 5/08* (2013.01); *B62K 7/04* (2013.01); *B62K 2710/12* (2013.01); *Y10T 29/49716* (2015.01)

(58) Field of Classification Search
CPC ....... B62K 13/04; B62K 7/00; B62K 2710/12
See application file for complete search history.

(56) References Cited

U.S. PATENT DOCUMENTS

| | | |
|---|---|---|
| 3,955,729 A | 5/1976 | Montgomery |
| 3,955,730 A | 5/1976 | Montgomery |
| 3,960,027 A | 6/1976 | Magnuson |

(Continued)

FOREIGN PATENT DOCUMENTS

| | | |
|---|---|---|
| EP | 2077223 | 7/2009 |
| WO | 2008043870 | 4/2008 |

OTHER PUBLICATIONS

S-cargo. (2012). Retrieved Mar. 2014, from COROFLOT: http://www.coroflot.com/ofir_y/s-cargo.

(Continued)

*Primary Examiner* — Joseph Rocca
*Assistant Examiner* — Gabriela C Craciun
(74) *Attorney, Agent, or Firm* — Price Heneveld LLP

(57) ABSTRACT

An apparatus is provided for bicycles to make them more utilitarian and functional. The attachment is easily attached, and potentially attached without damage or significant modification to the bicycle. The apparatus includes a frame member attached to the bottom bracket portion of the existing bicycle, and a gimbal attached to the fork of the existing bicycle in place of the original front tire. The apparatus is steerable using the handle bars and fork on the existing bicycle frame, and is configured for stability when cornering. The apparatus includes a cargo carrier located in front of the cycler where it is easy to see, while maintaining a stable center of gravity and also an ability to lean into corners for cornering stability. Variations include one or two front wheels, and one or two steering drive links. Also, the apparatus is a flexible design providing multiple potential utilitarian uses.

3 Claims, 24 Drawing Sheets

(56) References Cited

U.S. PATENT DOCUMENTS

| | | | |
|---|---|---|---|
| 4,020,914 | A | 5/1977 | Trautwein |
| 4,037,924 | A | 7/1977 | May |
| 4,045,049 | A | 8/1977 | Schultz |
| 4,088,199 | A | 5/1978 | Trautwein |
| 4,174,120 | A | 11/1979 | Freeman |
| 4,191,393 | A | 3/1980 | Niemann |
| 4,258,870 | A | 3/1981 | Edelson |
| 4,262,829 | A | 4/1981 | Hine, Jr. et al. |
| 4,285,674 | A | 8/1981 | Chew |
| 4,301,951 | A | 11/1981 | Pletscher |
| 4,313,517 | A | 2/1982 | Pivar |
| D263,293 | S | 3/1982 | Janson |
| 4,336,964 | A | 6/1982 | Pivar |
| 4,351,410 | A | 9/1982 | Townsend |
| 4,360,224 | A | 11/1982 | Sato et al. |
| 4,423,795 | A | 1/1984 | Winchell et al. |
| 4,437,535 | A | 3/1984 | Winchell et al. |
| 4,458,556 | A | 7/1984 | Schar |
| 4,461,365 | A * | 7/1984 | Diggs .................... 180/11 |
| 4,484,648 | A | 11/1984 | Jephcott |
| 4,527,811 | A | 7/1985 | DeMoss |
| D280,336 | S | 8/1985 | Webb |
| 4,546,997 | A | 10/1985 | Smyers |
| 4,600,216 | A | 7/1986 | Burkholder |
| 4,613,129 | A | 9/1986 | Schroeder et al. |
| 4,624,469 | A | 11/1986 | Bourne, Jr. |
| 4,629,104 | A | 12/1986 | Jacquet |
| 4,648,694 | A | 3/1987 | Bean |
| D289,630 | S | 5/1987 | Owens |
| 4,662,468 | A | 5/1987 | Ethier |
| 4,671,438 | A | 6/1987 | La Plante |
| D291,506 | S | 8/1987 | Shields |
| 4,688,749 | A | 8/1987 | Schlanger |
| 4,697,663 | A | 10/1987 | Trautwein |
| 4,715,681 | A | 12/1987 | Johnson |
| 4,794,815 | A | 1/1989 | Borromeo |
| 4,840,298 | A | 6/1989 | Belka |
| D305,628 | S | 1/1990 | Mannier |
| 4,903,857 | A | 2/1990 | Klopfenstein |
| 4,903,975 | A | 2/1990 | Weisbrodt et al. |
| 4,909,522 | A | 3/1990 | Flanigan |
| 4,909,538 | A | 3/1990 | Langton |
| 4,910,053 | A | 3/1990 | McDonald et al. |
| 4,919,225 | A | 4/1990 | Sturges |
| 4,944,360 | A | 7/1990 | Sturges |
| 4,953,425 | A | 9/1990 | Barefoot |
| 4,976,348 | A | 12/1990 | Berry |
| D315,328 | S | 3/1991 | Giard, Jr. |
| D315,888 | S | 4/1991 | Dixon |
| D316,389 | S | 4/1991 | Wood et al. |
| 5,025,977 | A | 6/1991 | Hartman |
| 5,102,153 | A | 4/1992 | Rhode |
| 5,112,071 | A | 5/1992 | Jones |
| 5,141,067 | A * | 8/1992 | Diggs .................... 180/11 |
| 5,156,031 | A | 10/1992 | Gaul |
| D331,902 | S | 12/1992 | Greenlaw |
| 5,169,166 | A | 12/1992 | Brooks |
| D332,768 | S | 1/1993 | Giard, Jr. |
| 5,199,619 | A | 4/1993 | Mostashari |
| 5,226,340 | A | 7/1993 | Takeda |
| 5,228,606 | A | 7/1993 | Hickson |
| 5,232,235 | A | 8/1993 | Brooks |
| 5,236,060 | A | 8/1993 | Huber |
| 5,248,011 | A | 9/1993 | Richards |
| 5,265,496 | A | 11/1993 | Townsend |
| D345,534 | S | 3/1994 | Abboud et al. |
| 5,292,143 | A | 3/1994 | Stauch et al. |
| 5,319,994 | A | 6/1994 | Miller |
| 5,330,214 | A | 7/1994 | Brooks et al. |
| D353,963 | S | 1/1995 | Peters |
| 5,431,243 | A | 7/1995 | Richards |
| 5,482,304 | A | 1/1996 | Smith |
| 5,513,865 | A | 5/1996 | Brooks et al. |
| 5,564,726 | A | 10/1996 | Hearn et al. |
| 5,618,052 | A | 4/1997 | Rendall |
| 5,641,108 | A | 6/1997 | Ewer |
| 5,762,351 | A | 6/1998 | SooHoo |
| D396,835 | S | 8/1998 | Roddy |
| D397,965 | S | 9/1998 | Ebeyer |
| 5,881,606 | A | 3/1999 | Roddy |
| 5,961,015 | A | 10/1999 | Shirakawa |
| D419,123 | S | 1/2000 | Okuda |
| 6,029,874 | A | 2/2000 | Meggitt |
| 6,036,069 | A | 3/2000 | Sayegh |
| D449,018 | S | 10/2001 | Musser |
| 6,328,268 | B1 | 12/2001 | Irie |
| 6,367,824 | B1 * | 4/2002 | Hayashi .................... 280/62 |
| 6,378,882 | B1 | 4/2002 | Devine |
| 6,382,485 | B1 | 5/2002 | Hoagland |
| 6,398,248 | B1 | 6/2002 | Dodson |
| 6,446,922 | B2 | 9/2002 | Irie |
| 6,464,030 | B1 | 10/2002 | Hanagan et al. |
| 6,491,316 | B1 | 12/2002 | Freeman |
| 6,506,026 | B2 | 1/2003 | Wu |
| 6,543,564 | B1 | 4/2003 | Kamen et al. |
| 6,663,122 | B1 | 12/2003 | Lin |
| D485,788 | S | 1/2004 | Guay et al. |
| 6,708,582 | B1 | 3/2004 | McJunkin et al. |
| 6,736,618 | B2 | 5/2004 | Wu |
| 6,763,740 | B1 | 7/2004 | Ose |
| 6,883,629 | B2 | 4/2005 | Hanagan |
| 6,929,080 | B2 | 8/2005 | Kamen et al. |
| 6,948,581 | B2 | 9/2005 | Fecteau et al. |
| 6,953,203 | B2 | 10/2005 | Wilcox et al. |
| 6,976,690 | B2 | 12/2005 | Freeman |
| 6,981,749 | B2 | 1/2006 | Cavazos et al. |
| 6,994,368 | B2 | 2/2006 | Brown |
| 7,073,806 | B2 | 7/2006 | Bagnoli |
| 7,137,671 | B2 | 11/2006 | Passarotto et al. |
| 7,144,029 | B1 | 12/2006 | Heady |
| 7,152,868 | B1 | 12/2006 | Minot |
| 7,172,045 | B2 | 2/2007 | Takayanagi et al. |
| 7,174,852 | B2 | 2/2007 | Jefferson |
| D549,074 | S | 8/2007 | Devine |
| 7,264,251 | B2 | 9/2007 | Marcacci |
| 7,273,221 | B2 | 9/2007 | Ockenden |
| 7,347,596 | B2 | 3/2008 | Ishikawa |
| D576,903 | S | 9/2008 | Thompson |
| 7,530,419 | B2 | 5/2009 | Brudeli |
| 7,543,829 | B1 | 6/2009 | Barnes |
| 7,552,790 | B2 | 6/2009 | Dower |
| 7,571,787 | B2 | 8/2009 | Saiki |
| 7,591,337 | B2 | 9/2009 | Suhre et al. |
| 7,669,868 | B2 | 3/2010 | Underhaug |
| 7,708,291 | B1 | 5/2010 | Henderson |
| 7,722,063 | B2 | 5/2010 | Dieziger |
| 7,731,210 | B2 | 6/2010 | Pedersen |
| 7,731,213 | B2 | 6/2010 | Saville |
| 7,739,030 | B2 | 6/2010 | Desai et al. |
| 7,850,180 | B2 | 12/2010 | Wilcox |
| 7,896,207 | B1 | 3/2011 | Latham |
| 7,909,340 | B2 | 3/2011 | Henderson |
| 7,958,956 | B2 | 6/2011 | Kakinuma et al. |
| 7,970,530 | B2 | 6/2011 | Desai et al. |
| 8,028,777 | B2 | 10/2011 | Kakinuma et al. |
| 8,061,465 | B2 | 11/2011 | Martino |
| 8,066,295 | B1 | 11/2011 | Cusack et al. |
| 2006/0097476 | A1 * | 5/2006 | Kobayashi .................... 280/287 |
| 2006/0273544 | A1 | 12/2006 | Donovan |
| 2007/0278763 | A1 | 12/2007 | Saville |
| 2012/0320943 | A1 * | 12/2012 | Cramer et al. .................... 374/102 |

OTHER PUBLICATIONS

Noomad System. (2012). Retrieved Mar. 2014, from Noomad Advanced Riding System: http://www.noomadbike.com/en/20-basica.

* cited by examiner

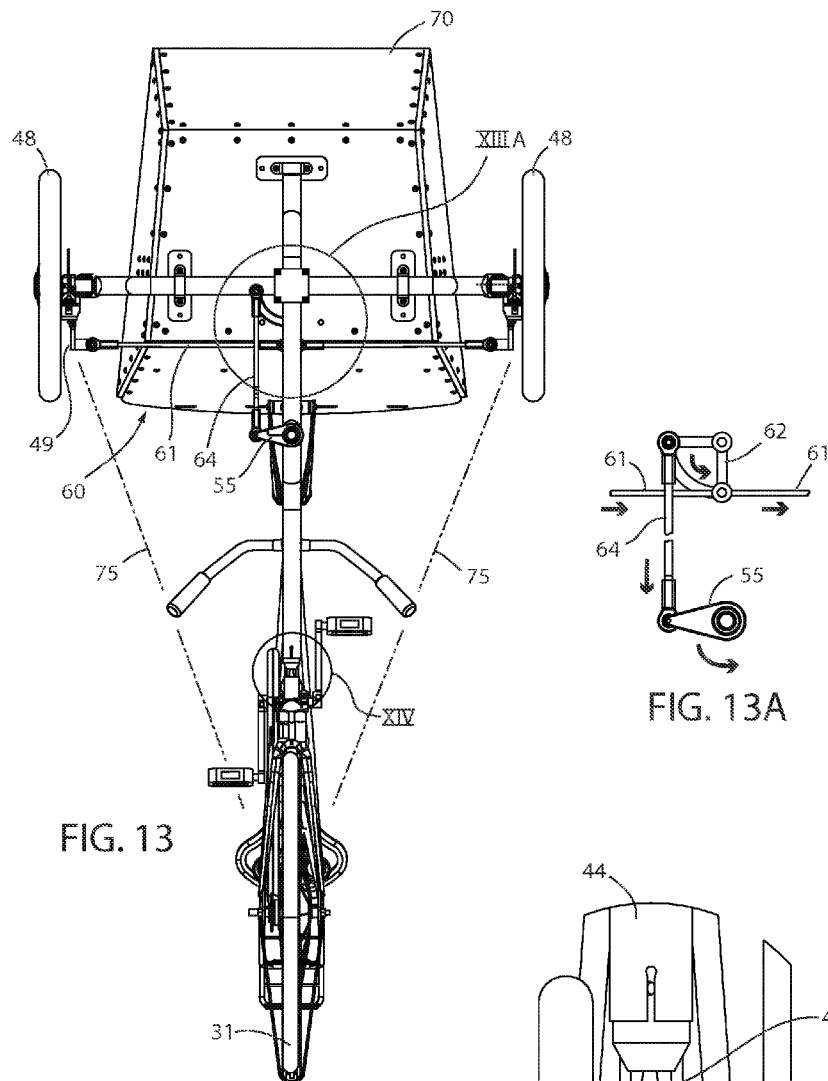
FIG. 13
FIG. 13A
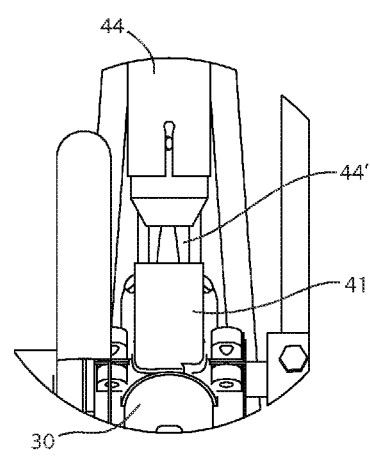
FIG. 14

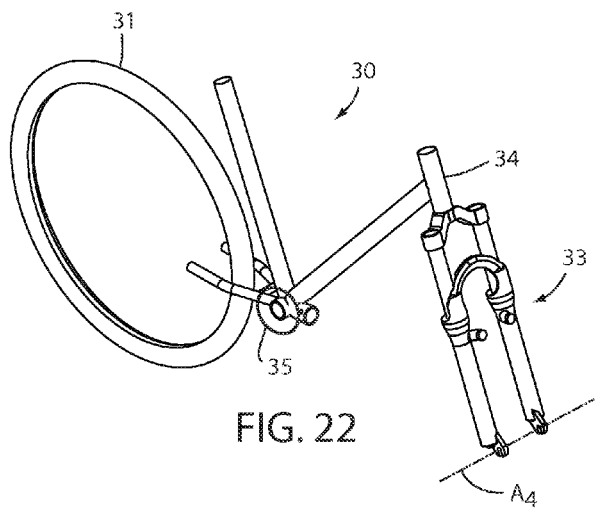
FIG. 22
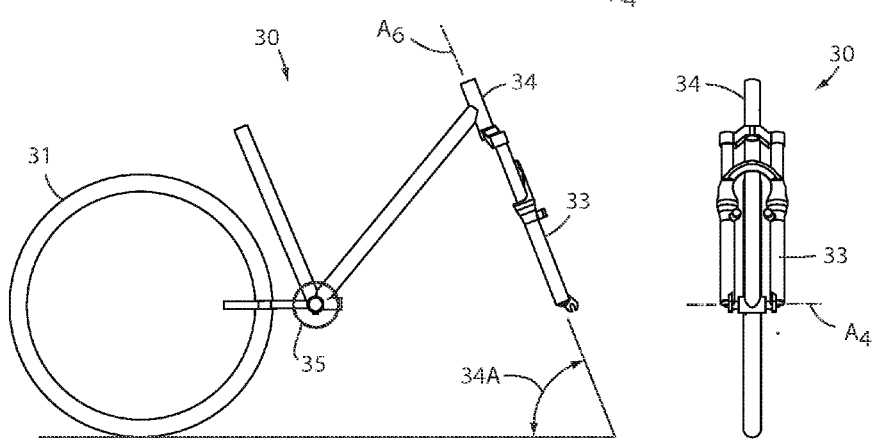
FIG. 23
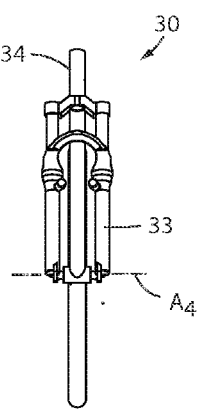
FIG. 24
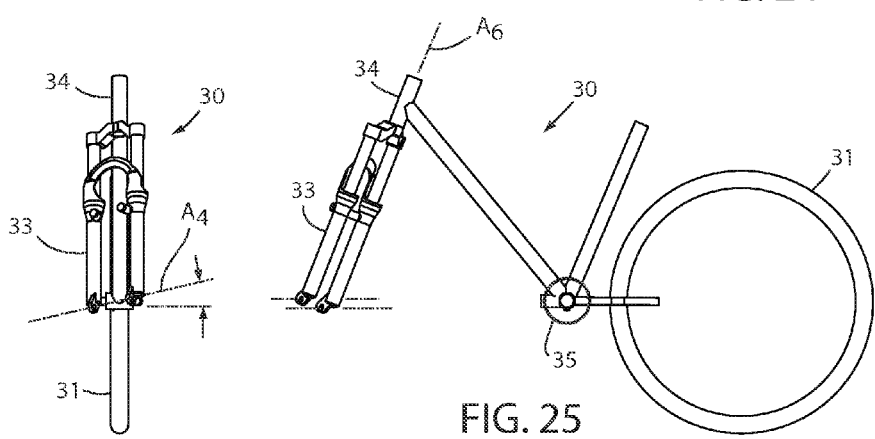
FIG. 25
FIG. 26

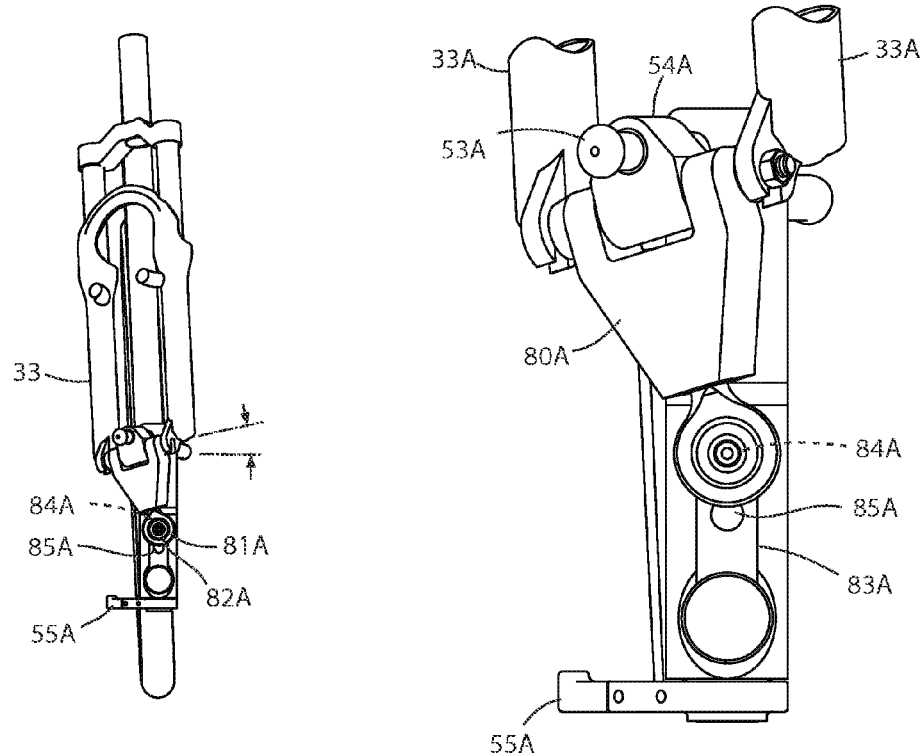
FIG. 29
FIG. 29A
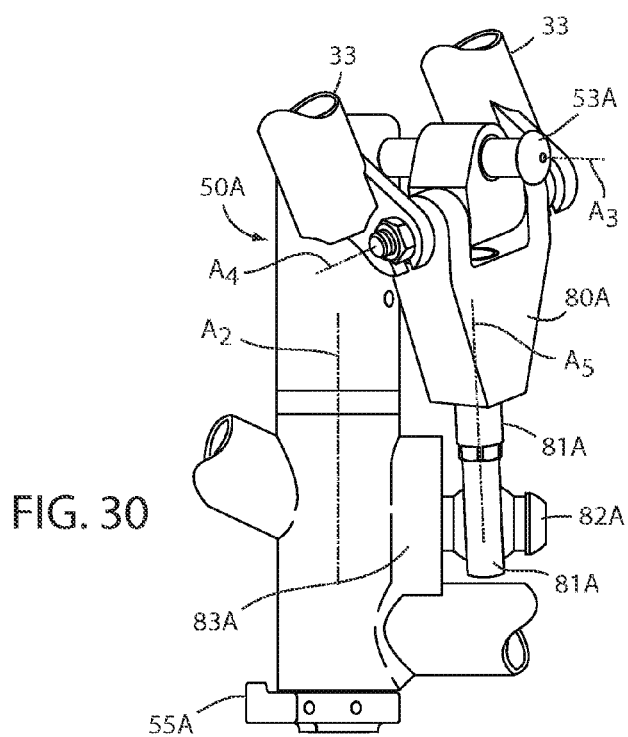
FIG. 30

BICYCLE CONVERSION KIT AND TRICYCLE APPARATUS

This application claims benefit under 35 USC §119(e) of provisional application Ser. No. 61/709,336, filed Oct. 3, 2012, entitled BICYCLE CONVERSION KIT AND TRICYCLE APPARATUS, the entire contents of which are incorporated herein by reference.

BACKGROUND

The present invention relates to self-propelled bicycles and tricycles, and more particularly relates to a kit for converting a bicycle to a tricycle, where the kit further includes adaptations for specialized use such as for transporting cargo. The present invention also relates to a kit for converting a traditional bicycle into a cargo bicycle with elongated frame.

Many different manually propelled bicycles and tricycles exist. Further, some are adapted with baskets or other carriers to allow safe and secure carriage of items. However, known manually-propelled bicycles and tricycles are often cumbersome, heavy, and/or expensive. Some devices have also been constructed to combine two bicycles into a four-wheeled device that can be manually pedaled. However, further improvements are desired in terms of lower cost, greater simplicity in structure (including ease of assembly), and greater functionality for specialized function while maintaining optimal aesthetics. Also, it is desired to have a tricycle adapted to lean into corners to improve overall stability and the operator's sense of stability while cornering. Also, it is desired to have a conversion kit which would take advantage of existing bicycle frames and components while incorporating new structures that are robust and well-designed for good rideability.

SUMMARY OF THE PRESENT INVENTION

An attachment is provided for existing bicycles that makes the cycle more utilitarian and more functional, and that is easily attached without damage or permanent modification to the bicycle. The attachment includes a telescopingly attached frame member that attaches to the bottom bracket portion of the existing bicycle and a gimbal that attaches to the fork of the existing bicycle in place of the front wheel assembly. The attachment is steerable using the handle bars and fork on the existing bicycle frame, and is configured for stability when cornering. The attachment positions cargo in front of the cycler where it is easy to see, while maintaining a stable center of gravity and the ability to lean into corners for cornering stability. Also, the attachment is a flexible design providing multiple potential utilitarian uses.

In one aspect of the present invention, an apparatus is provided for converting a two-wheeled bicycle to a three-wheeled tricycle, where the bicycle includes a primary frame, a rear wheel, and a steering mechanism including handle bars connected to front forks and journaled to the primary frame for turning the front forks. The apparatus includes a pivot adapter configured for attachment to the primary frame, a T-frame including a frame crossbar and a frame rearward bar, the rearward bar engaging the pivot adapter for rotation, the frame crossbar including an axle support at each end, and a front axle assembly at each end of the frame crossbar and each including a king pin rotatably engaging the axle support and a stub axle for supporting a front wheel and a steering control arm, the stub axle defining a nonvertical inclined axis. The apparatus further includes a gimbal assembly on the frame rearward bar of the T-frame located rearward of the front forks and having a vertical mount fixed to the T-frame, a gimbal vertical axis member rotatable about a generally vertical axis on the vertical mount, a gimbal horizontal axis member rotatable about a generally horizontal axis on the gimbal vertical axis member, a fork slider slideable on the gimbal horizontal axis member and adapted for connection to the front forks, a steering driver arm extending from the gimbal vertical axis member, a steering mechanism including cross-vehicle steering bars connected to the steering control arms on each end of the cross-vehicle steering bars, a steering leverage arm connected to the cross-vehicle steering bars and pivoted to the frame crossbar, and a steering rearward bar, or bars, connecting the steering leverage arm to the steering driver arm.

In another aspect of the present invention, an apparatus includes a primary frame, a rear wheel, and a steering mechanism including handle bars connected to front forks and journaled to the primary frame for turning the front forks, a pivot adapter attached to the primary frame, a subframe engaging the pivot adapter for rotation and extending side-to-side and including an axle support at each side, a front axle assembly at each side of the subframe and each including a king pin rotatably engaging the axle support and a stub axle for supporting a front wheel and a steering control arm, a gimbal assembly on the subframe and including a front-fork-engaging member and a steering driver arm, and a steering mechanism including a steering bar operably connected to the steering control arms and to the gimbal assembly so that upon rotation of the handle bars and front forks and upon tilting of the primary frame, the steering driver arm moves the steering control arms to steer the front wheels. The apparatus allows the front wheels to tilt simultaneously with the primary frame for cornering, but does not require it.

In another aspect of the present invention, a cycle apparatus includes a primary frame, a rear wheel on the primary frame, and steerable handle bars journaled to the primary frame and adapted for steering, a subframe operably connected to the primary frame so that the primary frame can tilt away from a coplanar position with the subframe, the subframe having at least one steerable front wheel, and a gimbal and steering assembly attached to the primary frame and to the subframe including a steering control connecting the two steerable front wheel to the steerable handle bars. By this arrangement, a rider can motivate the primary frame and tilt the primary frame when turning corners and simultaneously can steer the at least one front wheel.

In another aspect of the present invention, a cycle apparatus includes a primary frame, a rear wheel on the primary frame, and steerable handle bars journaled to the primary frame and adapted for steering, a subframe operably connected to the primary frame so that the primary frame can tilt relative to the subframe, the subframe having two steerable front wheels, and a gimbal and steering assembly attached to the primary frame and to the subframe including a steering control connecting the two steerable front wheels to the steerable handle bars. By this arrangement, a rider can motivate the primary frame and tilt the primary frame when turning corners and simultaneously steer the two front wheels without tilting the subframe.

In another aspect of the present invention, a cycle apparatus includes a primary frame with seat, manually driven rear wheel, and manually steerable handle bars and a wheeled front subframe operably connected to the primary frame at a first joint so that the primary frame can tilt relative to the subframe, the subframe having at least one steerable front wheel operably attached to the steerable handle bars. By this arrangement, a rider can motivate the primary frame and tilt the primary frame when turning corners and simultaneously steer the at least one front wheel.

In another aspect of the present invention, an attachment is provided for a cycle apparatus that includes a primary frame, a rear wheel, and a steering mechanism including handle bars connected to primary front forks and journaled to the primary frame for turning the primary front forks. The attachment includes a front-wheel extender apparatus including a secondary frame attached to the primary frame with a front portion extending forward of the primary front forks, the extender apparatus having secondary front forks supported on the front portion and that support at least one front wheel, the extender apparatus including a steering mechanism extender operably connecting the primary front forks to the secondary front forks for steering the at least one front wheel.

In another aspect of the present invention, a method includes providing a bicycle frame including handle bars, a front fork, and a bottom bracket portion, providing an attachment including a frame member with a gimbal and at least one wheel, and attaching a frame member to the bottom bracket portion and attaching the gimbal to the front fork of the bicycle in place of a front wheel assembly to form a carrier apparatus.

An object of the present invention is to provide an attachment that allows for the conversion of a standard bicycle to a three-wheeled cycle.

An object of the present invention is to provide an attachment converting a bicycle to a more utilitarian system, such as converting the bicycle to provide a one (or two) child carrier, a cargo (or luggage) carrier, a delivery cart, a wheelchair with occupant carrier, a vendor cart, a frozen confection cart, an advertisement cart, and the like.

These and other aspects, objects, and features of the present invention will be understood and appreciated by those skilled in the art upon studying the following specification, claims, and appended drawings.

BRIEF DESCRIPTION OF DRAWINGS

FIGS. 9-13 are perspective, side, front, top and bottom views of FIG. 1, and FIG. 13A is an enlargement of the circled area XIIIA in FIG. 13 but with the subframe removed to better show underlying steering components.

FIG. 14 is an enlarged view of the circled area XIV in FIG. 13.

FIGS. 22-24 are perspective, side and front views of an exemplary bicycle main frame with the steering mechanism is a straight (no-turn) position.

FIGS. 25-26 are side and front views similar to FIGS. 23, 24 but with the steering turned toward a right side.

FIG. 29 is a front view like FIG. 28 but with the modified gimbal assembly of FIG. 19 adjusted to a high position; FIG. 29A disclosing an enlarged portion of FIG. 29.

FIG. 30 is an enlarged view of the circled area showing the modified gimbal assembly in FIG. 27.

DETAILED DESCRIPTION OF PREFERRED EMBODIMENTS

The present apparatus is provided for converting a two-wheeled bicycle to a functional three-wheeled tricycle with cargo carrier. It is contemplated that the present innovation can be provided as a kit for assembly for converting an existing bicycle to a tricycle, or can be part of an original complete construction. When assembled, the present apparatus becomes a functional tricycle, using the manual pedal motivation system and steering (and frame and braking) of the original bicycle, but also using a stable front frame carried by stable, spaced front wheels that tilt for cornering stability. The present system is designed to allow a rider to tilt the entire rear wheel and primary frame into a corner, with the front spaced wheels also tilting and turning for cornering, but while the carrier and front subframe of the apparatus remain flat and untilted relative to ground.

Figure 1:
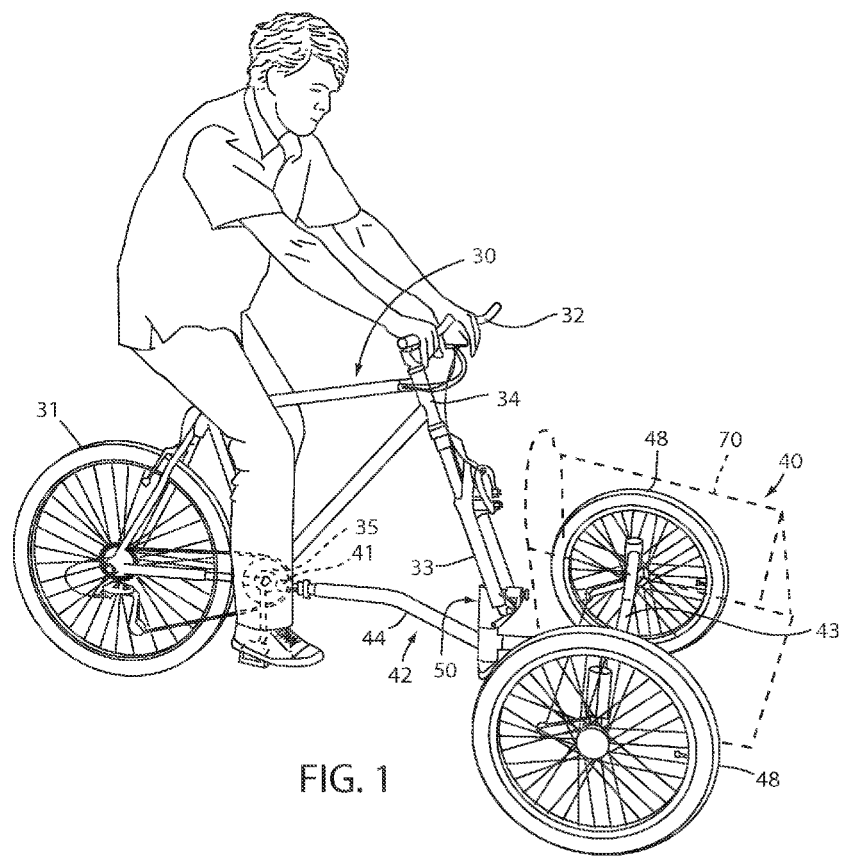
FIGS. 1-2 are side and front views showing an apparatus embodying the present invention, including a T-shaped subframe assembly with two front wheels mounted to an existing bicycle frame.
Figure 1A:
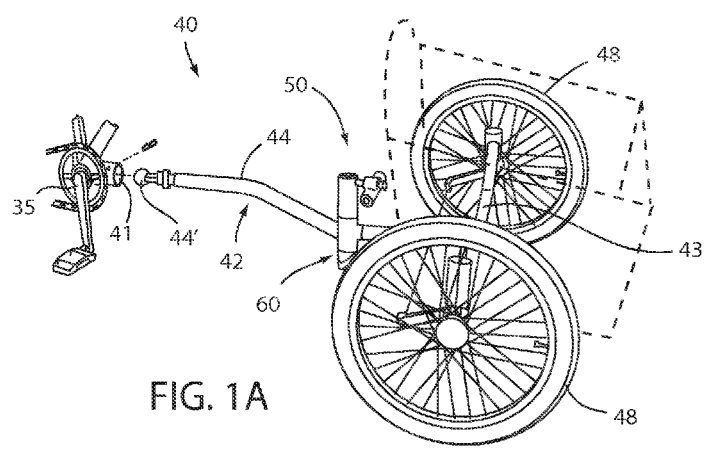
FIG. 1A is a perspective view of the T-shaped subframe assembly in FIG. 1.

The illustrated existing bicycle includes a primary frame 30 (FIGS. 1, 22), a rear wheel 31, pedal drive 31', and a steering mechanism including handle bars 32 connected to front forks 33 (which are adapted to support a front wheel) and journaled to the primary frame 30 at bearing 34 for turning the front forks 33.

Figure 11:
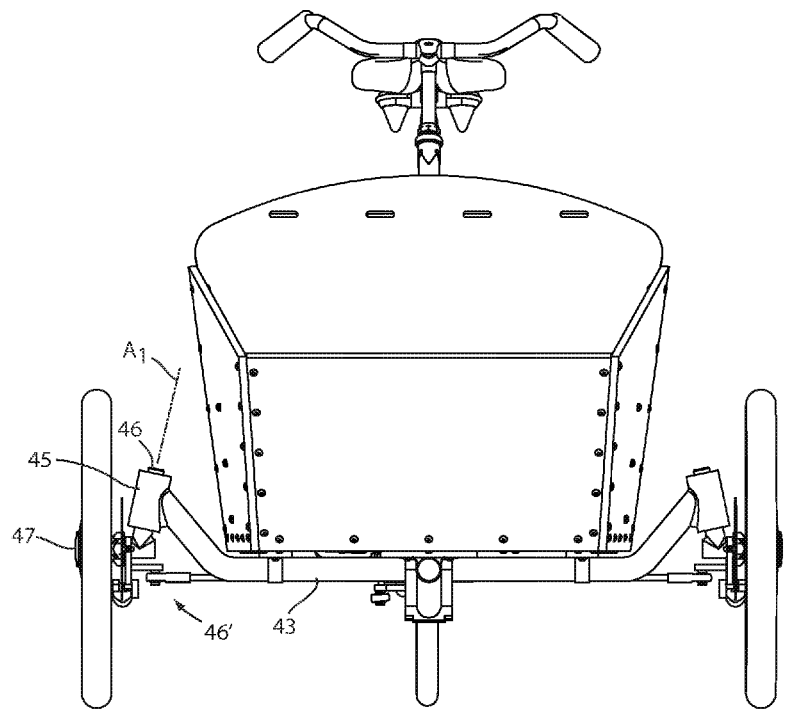
Figure 12:
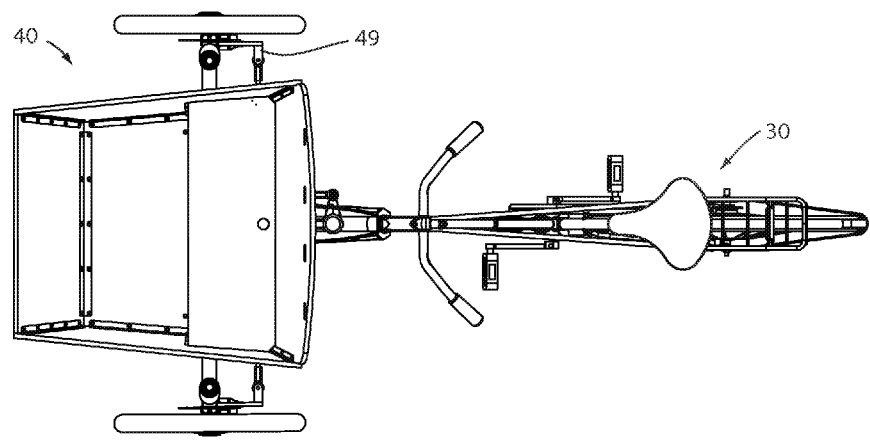

The present apparatus 40 (also called a "conversion kit" herein) includes a pivot adapter 41 (also called a "bottom bracket ball socket") configured for attachment to the primary frame 30 adjacent the pedal system journal 35 on the primary frame 30 (e.g. by a strap or clamp, or by other mechanical means, or via a permanent securement method such as welding or brazing), a T-shaped front subframe 42 including a frame crossbar 43 and a frame rearward bar 44 (also called "tongue"), the rearward bar 44 includes a tongue 44' (FIG. 14) with ball that telescopingly connects and rotatably engages the pivot adapter 41 for rotation (i.e. permitting the primary frame 30 to tilt toward a side for cornering while the subframe 42 remains horizontal), the frame crossbar 43 (FIG. 11) including an axle support 45 (also called "king pin support bearing") at each end, and a front axle assembly 46' at each end of the frame crossbar 43 and each including a king pin 46 rotatably engaging the axle support 45 and a stub axle 47 for supporting a front wheel 48 and a steering control arm 49, the axle support 45 defining a nonvertical inclined axis A1.

Figure 16:
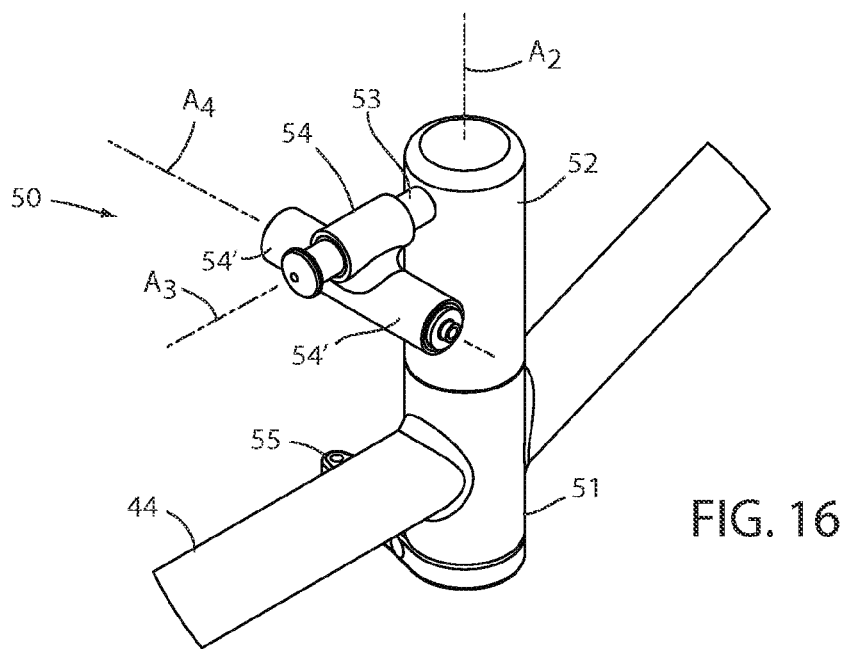
FIGS. 16-18 are perspective, side, and side cross section of the gimbal assembly of FIG. 13.
Figure 17:
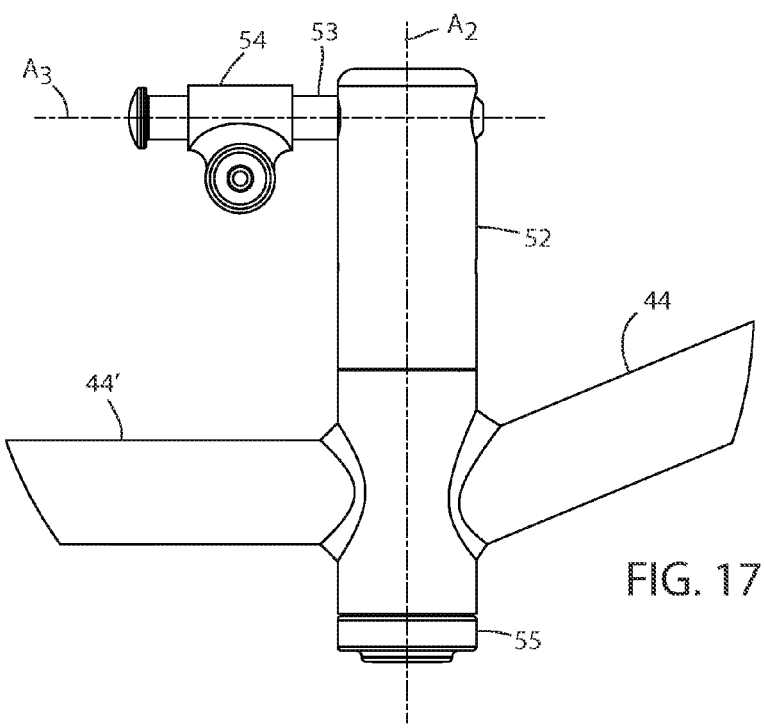
Figure 18:
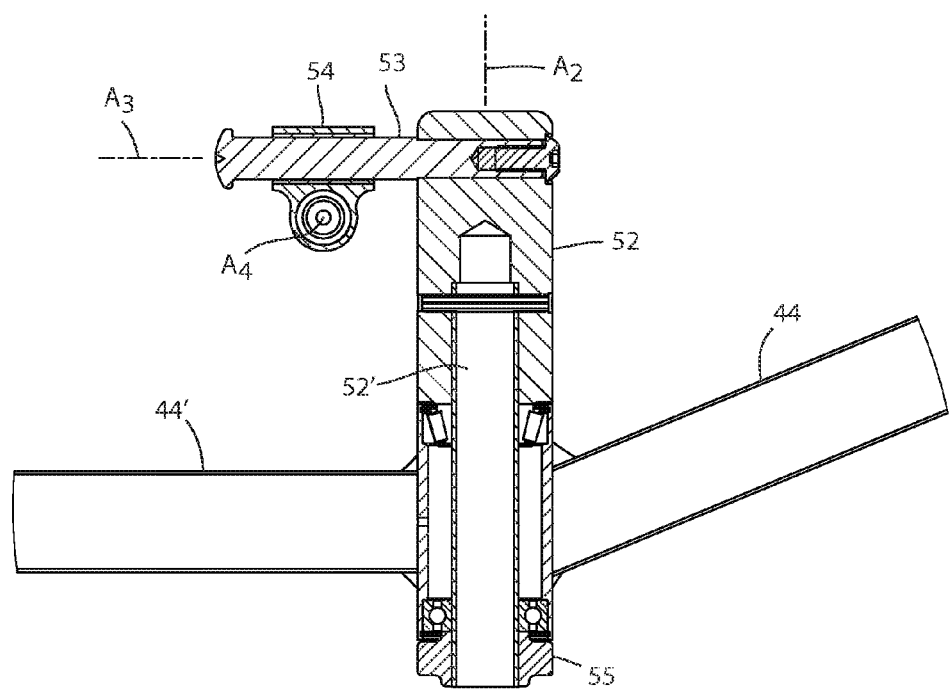

The apparatus 40 further includes a gimbal assembly 50 (FIG. 16) on the frame rearward bar 44 of the T-shaped subframe 42 located slightly rearward of the front forks 33. The gimbal assembly 50 includes a vertical mount 51 fixed to the T-shaped subframe 42, a gimbal vertical axis member 52 (FIG. 18) rotatable about a generally vertical axis A2 defined by the vertical mount 51, a gimbal horizontal axis member 53 comprising a pivot pin defining a generally horizontal axis A3, a fork slider 54 translatingly moveable on the gimbal horizontal axis member 53 and having opposing aligned arms 54' for connection to ends of the front forks 33, and a steering driver arm 55 (also called a "rearward steering link") (FIG. 16) extending from the bottom of the gimbal vertical axis member 52.

Figure 15:
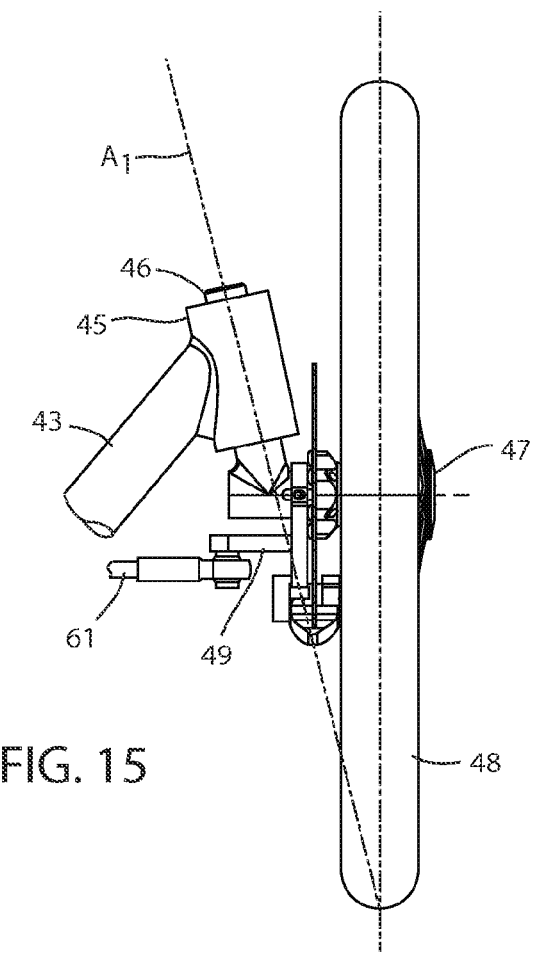
FIG. 15 is an enlarged view of the king pin, stub axle, steering arm assembly supporting the front wheel.

A steering mechanism 60 (FIG. 13) includes cross-vehicle steering bars 61 (also called "steering tie rods") connected to the steering control arms 49 on each end of the cross-vehicle steering bars 61, a steering leverage arm 62 (also called a "forward steering link") connected to the cross-vehicle steering bars 61 and pivoted to the frame crossbar 43, and a steering rearward bar 64 (also called a "linkage tie rod") connecting the steering leverage arm 62 to the steering driver arm 55. As illustrated in FIG. 13, the present steering geometry places steering pivot points on a line 75 between the king pin axis A1 and the contact point of the rear wheel 31. This allows the inside front wheel 48 and the outside front wheel 48 to track different radii in a turn. This provides for better handling and less tire scrub. As illustrated in FIG. 15, the king pin axis A1 is angled so that it defines a line passing through a point close to where the front tire contacts the ground. This minimizes the effects that bumps or pot holes have on steering of the cycle.

By the above arrangement, the apparatus 40 can be attached to most existing bicycles having a primary frame, a rear wheel, and a steering mechanism including handle bars connected to front forks and journaled to the primary frame for turning the front forks. To assemble, the pivot adapter 41 is attached to the primary frame 30, and the subframe 42 is engaged into the pivot adapter 41 for rotation, with the subframe 42 extending side-to-side and including an axle support 45 at each side. The method includes attaching the steering mechanism 60 operably to the front forks 33, with the rest of the steering components and gimbal assembly connected so that, upon rotation of the handle bars 32 and front forks 33, the steering driver arm 55 moves the steering control arms 49 to steer the front wheels. It is noted that the present structure allows the primary frame 30 and front wheels to simultaneously tilt into a corner when cornering, but does not require tilting.

The illustrated carrier 70 (FIGS. 9-13) is a box-like or wheelbarrow-like structure having rigid sides and bottom made of wood or other structural material, and defining an upwardly open container. It is attached to the T-shaped subframe 42 by screws or by a quick-release clamp (not specifically shown, but known in the art and commercially available). For example, the present carrier 70 is useful for carrying groceries or other bagged items, or other cargo. It is contemplated that the carrier could instead be adapted to carry people (e.g. a child or children, a handicapped person, or a wheelchair bound person), or to carry a cargo or vendor-related items (e.g. an ice chest for a mobile frozen confection cart, or an insulated/heated box for a mobile hot food cart), or for transporting other items (e.g. tools, construction materials), or for carrying an advertisement. It is contemplated that the carrier 70 can be releasably attached to the subframe 42 (e.g. fastened to the frame crossbar and tongue). This leads to a mobile transport system and method where goods, products or materials are transported to a location for use, the carrier 70 is detached by quick-release fasteners and removed, a new carrier filled with other materials (e.g. waste or completed assembled parts) is loaded onto the subframe 42, and the apparatus is pedaled away with its new load (e.g. to pick up yet another load). Also, it is contemplated that a front panel 71 of the box-shaped carrier 70 could be pivoted to tip forward and form a ramp into the carrier 70. Thus, the carrier could be configured to receive a wheelchair or wheeled cart for carriage.

FIG. 13 illustrates a condition referred to as an "Ackermann steering geometry", where steering pivot points lie on a line 75 between the kingpin axis A1 and the contact point of the rear wheel 31. As noted above, this allows the inside front wheel 48 and the outside front wheel 48 to track different radii in a turn, which provides for getter/improved handling and less tire scrub.

Figure 20:
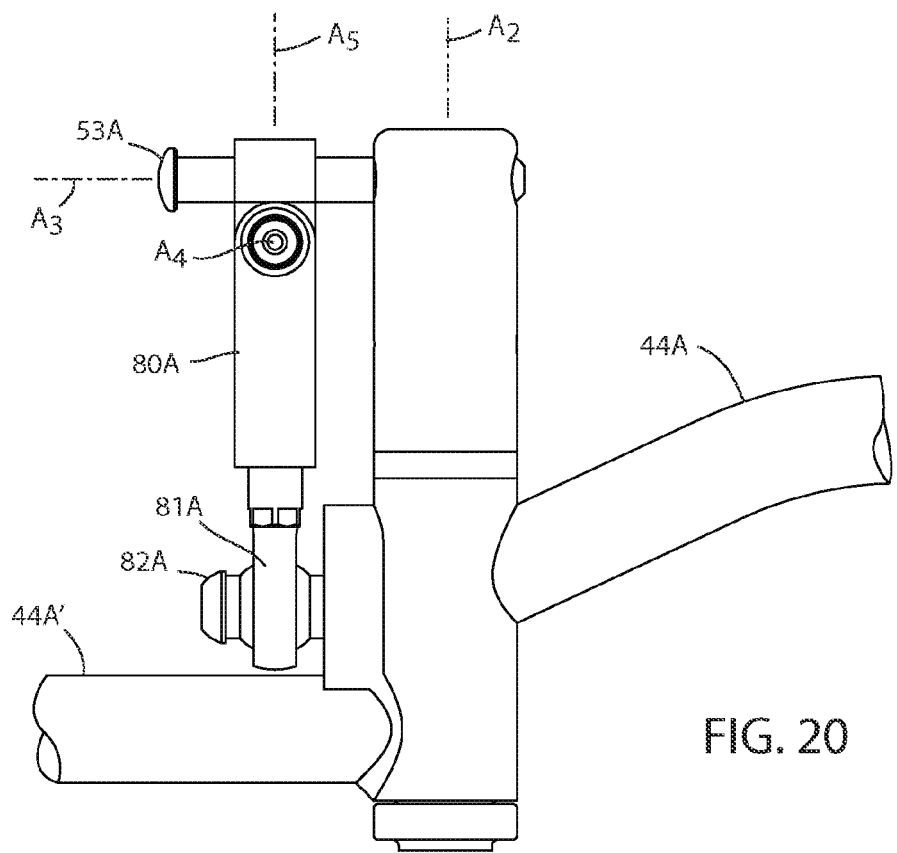
FIGS. 20-21 are side and cross sectional side views of FIG. 19.
Figure 21:
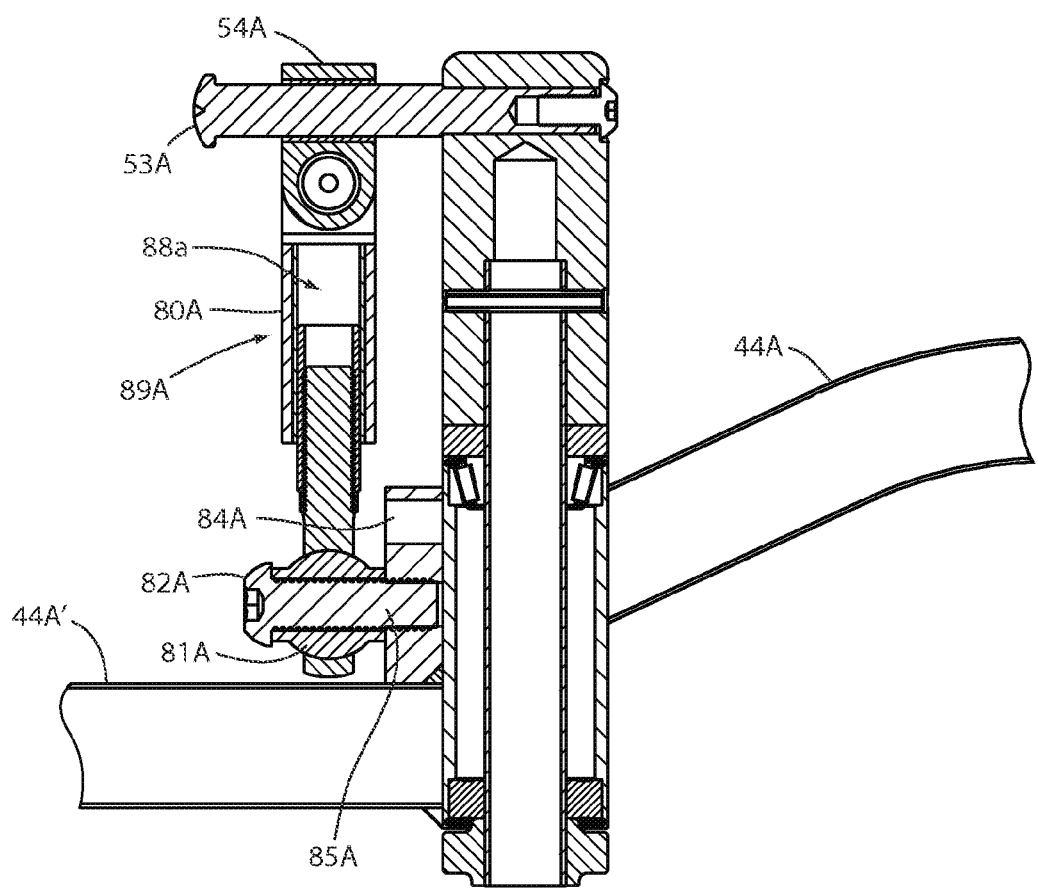
Figure 27:
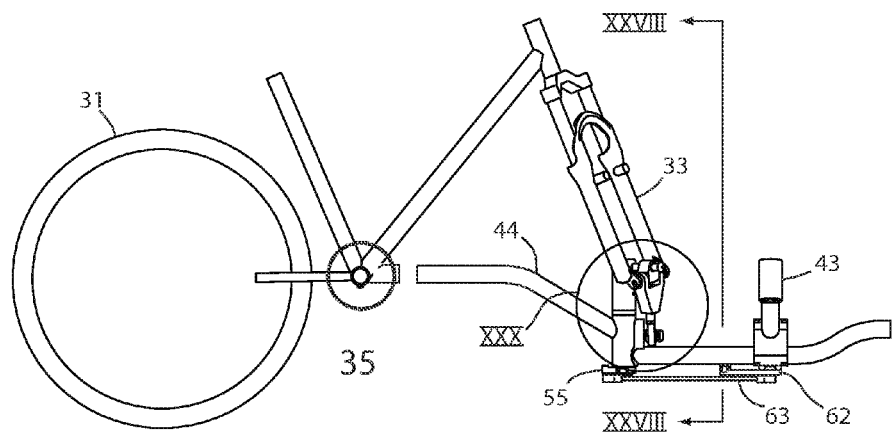
FIGS. 27-28 are side and front views like FIGS. 25, 26 but with the modified gimbal assembly of FIG. 19 attached to the forks of the steering mechanism, the gimbal assembly being adjusted to a low position.
Figures 28, 28A:
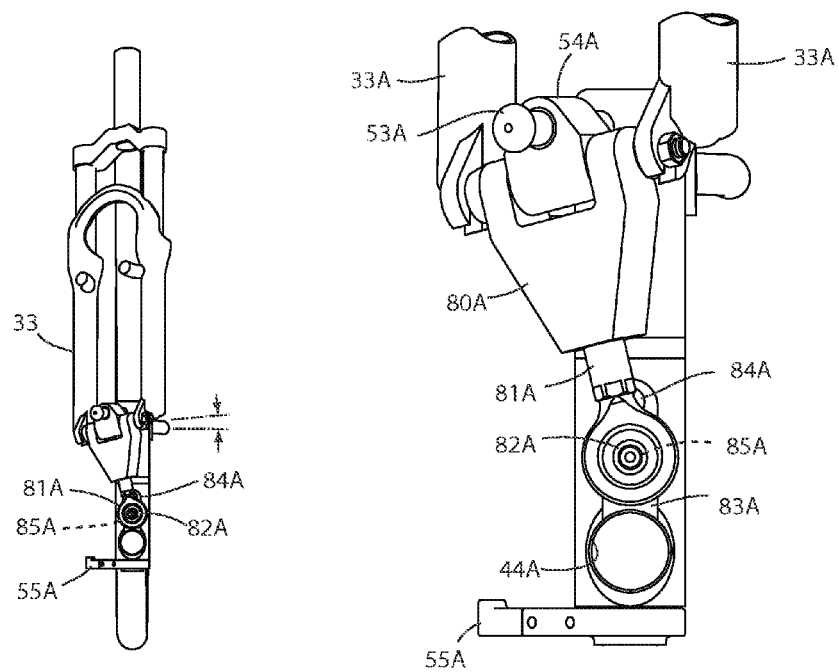
FIG. 28A disclosing an enlarged version of a portion of FIG. 28.

A modified gimbal assembly 50A (FIGS. 19-21) includes a plurality of components identical or similar to the gimbal assembly 50, and identifies them using similar numbers but with addition of a letter "A". This is done to reduce or eliminate redundant discussion.

The modified gimbal assembly 50A includes a gimbal horizontal axis stud 53A, a fork slider 54A, a gimbal vertical axis A2, gimbal horizontal axis A3, gimbal yoke 80A, yoke stabilizer 81A, stabilization bolt 82A, frame portion 83A, high bolt threaded socket 84A, and low bolt threaded socket 85A. The stabilizer bolt 82A controls the tilt steering. When the stabilizer bolt 82A is removed, the yoke stabilizer 81A can be removed and the bicycle and rider can lean into turns independent of the conversion kit 40A. When the stabilizer bolt 82A is used in (low) position #1, i.e. location 85A, the bicycle and rider remain nearly vertical regardless of the amount of steering angle. When the stabilizer bolt 82A is used in (high) position #2—location 84A, the bicycle and rider lean into the turn and the amount of lean is a function of the steering angle. The gimbal vertical axis A2 is aft of the bicycle fork horizontal axis A4. This minimizes front to back movement of the fork slider 54A during turning about the gimbal vertical axis A2.

The stabilization caused by the above structure is the result of the angle 34A of the head tube 34 of the bicycle (FIG. 23). The head tube angle 34A (defined by the "steering axis" A6) on a bicycle is not vertical with respect to the ground. The head tube angle is swept back from vertical and ranges from 65 to 75 degrees with respect to horizontal. Because of this angle, as the fork 34 is rotated about its steering axis A6, an end of the inside front fork 33 drops in elevation (FIGS. 25-26), and the end of the outside front fork 33 rises in elevation. This causes the front wheel axis A4 to tilt with respect to the horizontal ground. The amount the front wheel axis A4 tilts with respect to the horizontal ground is a function of the amount of fork rotation about the steering axis A6. As the lower right illustration shows, when the fork 33 of this particular bicycle geometry is rotated 30 degrees about the steering axis, the front wheel axis A4 tilts about 12 degrees. Therefore, to keep the bicycle vertical when turning, the fork slider 54A must rotate about the horizontal gimbal axis A3 by this same amount, in this case, the 12 degrees.

As mentioned above, in order to keep the bicycle vertical during a turn, the fork slider must rotate about the gimbal horizontal axis A3 an amount equal to the front wheel axis tilt A4. This fork slider 54A rotation is accomplished through the use of the gimbal yoke 80A, the yoke stabilizer 81A and the stabilizer bolt 82A. The gimbal yoke 80A has an internal bore 88A and bushing 89A that create an internal gimbal yoke axis A5 that is perpendicular to the front wheel axis A4. The yoke stabilizer 81A is a cylindrical shaped part and can telescope in and out of the bore 88a in the gimbal yoke 80A like a piston. The bottom of the yoke stabilizer 81A is bolted to the subframe portion 83A with the stabilizer bolt 82A. The yoke stabilizer 81A has a ball on its lower end and the stabilizer bolt 82A has a socket that engages the ball to form a ball and socket joint which allows the yoke stabilizer 81A to rotate about multiple axes on the stabilizer bolt 82A.

The stabilizer bolt 82A can be threaded into a block in the subframe portion 83A at two different positions: an upper position defined by threaded socket 84A and a lower position defined by threaded socket 85A. When the stabilizer bolt 82A is in the lower position 85A, the distance from the axis of the stabilizer bolt 82A to the gimbal horizontal axis A3 is such that the fork slider is forced to rotate about the gimbal horizontal axis A3 an amount approximately equal to the amount the front wheel axis A4 tilts when the forks 33A are rotated. When the stabilizer bolt 82A is in the upper position, the distance from the stabilizer bolt 82A to the gimbal horizontal axis A3 is reduced, causing the fork slider 54A to rotate more than the amount the front wheel axis A4 tilts when the forks 33A are rotated. This has the effect of causing the bicycle and rider to tilt and lean into the turn. More generally stated, when the handle bar is rotated, the amount of lean is a function of that handle bar rotation, which is controlled by the gimbal yoke and stabilizer bolt interaction. When the stabilizer bolt 82A is removed, the yoke stabilizer 81A can then be removed and the fork slider 54A is free to rotate about the gimbal horizontal axis A3 independent from the frame 42/83A.

By using the present system, a person can use their existing bicycle for many different uses, making their current bicycle more utilitarian. The present system is very flexible and can be installed on most existing bicycles. It includes a pivot adapter and a telescopingly attached frame member that attaches to the bottom bracket portion of an existing bicycle and a gimbal that attaches to the fork of the existing bicycle in place of the front tire. The telescoping portion allows for the conversion kit to fit virtually any size of bicycle frame. An advantage of the present system is that the cycle positions the cargo in front of the cycler, while maintaining a stable center of gravity and the ability to lean into corners for cornering stability.

Modified apparatus are shown in FIGS. 31-44. In these figures and the related discussion, identical and similar components, features, characteristics and functions are identified by the same number with an additional letter such as "B", "C" and etc. This is done to reduce or eliminate redundant discussion.

Figure 31:
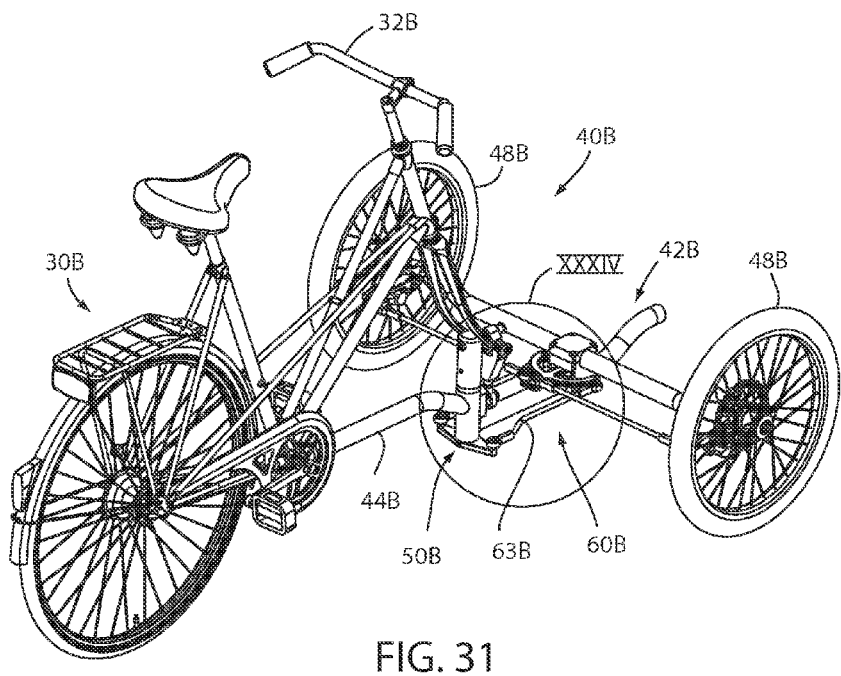
FIGS. 31-33 are perspective, side and front views of a modified apparatus embodying the present invention, including a T-shaped subframe assembly with two front wheels but modified to include two steering rearward bars, FIG. 31 not showing the carrier and FIGS. 32-33 showing the carrier.
Figure 32:
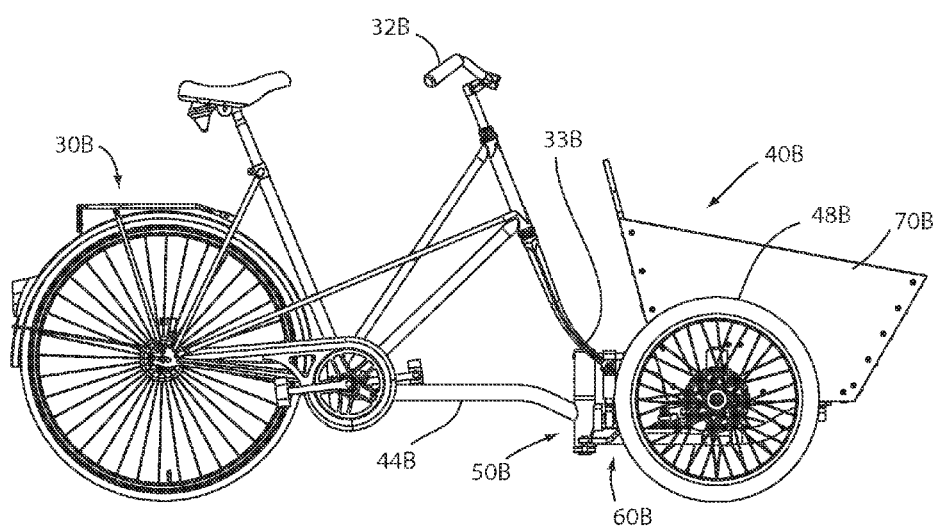
Figure 33:
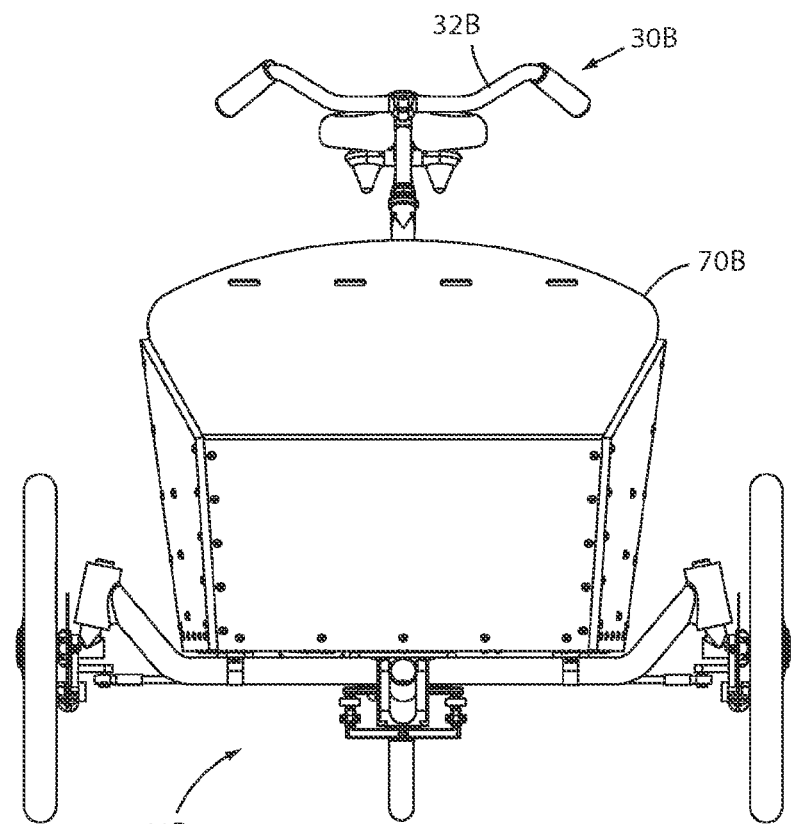
Figure 34:
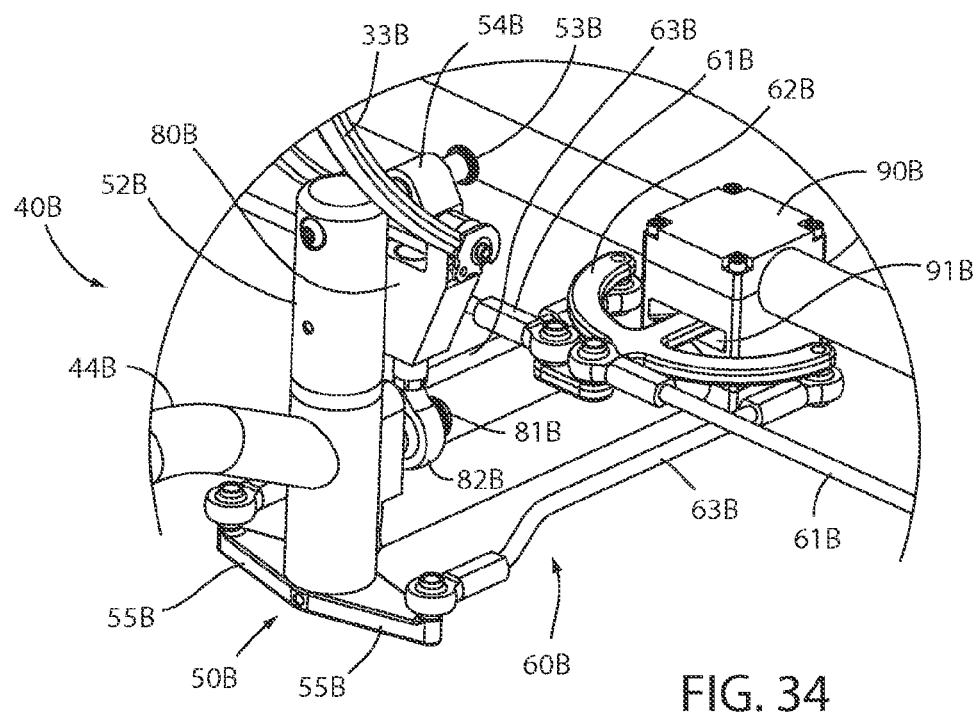
FIG. 34 is an enlarged view of the circled area in FIG. 31, focusing on the steering mechanism.
Figure 35:
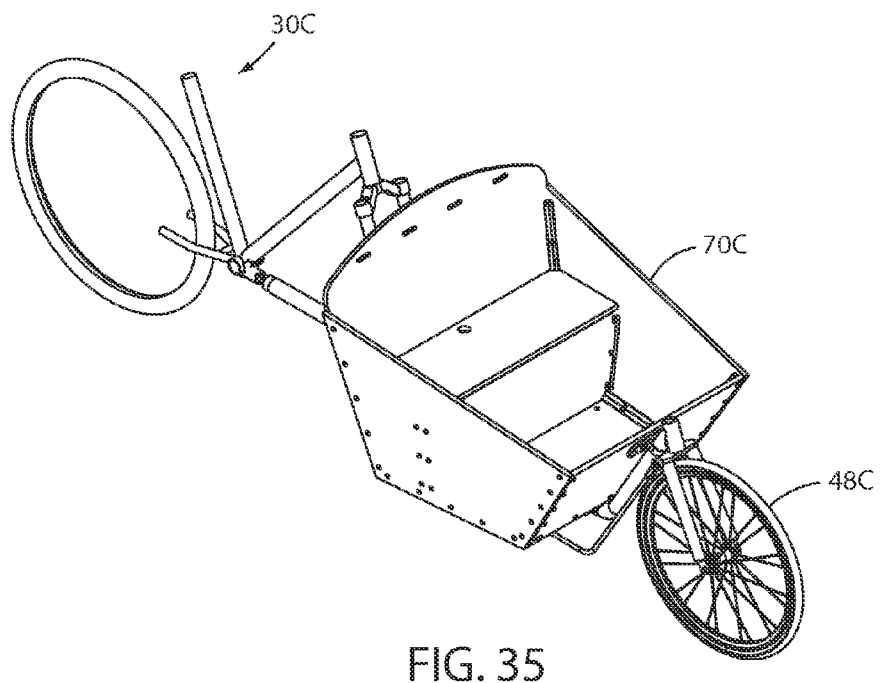
FIGS. 35-36 are perspective views of another modified apparatus embodying the present invention, including a single-bar subframe assembly with one front wheel and one driving steering rearward bar, FIG. 35 showing the carrier and FIG. 36 not showing the carrier.
Figure 36:
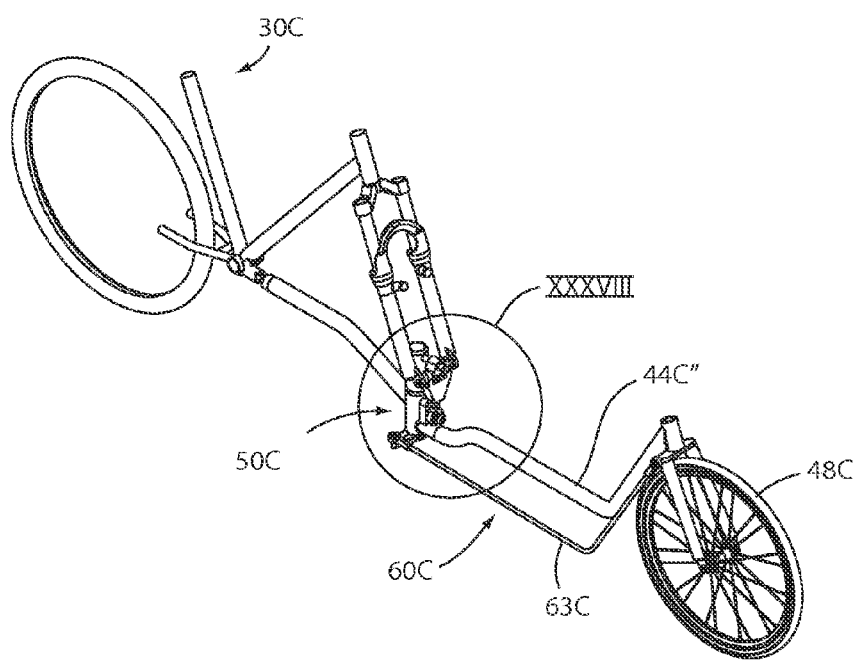

A modified apparatus 40B is shown in FIGS. 31-33 and includes a steering mechanism 60B with two steering rearward bars 63B and two front wheels 48B. The modified apparatus 40B includes a majority components identical to (or very similar to) apparatus 40, including a T-shaped subframe assembly 42B with two front wheels 48B and steering mechanism 60B operably connected between the bicycle's forks 33B and the front wheels 48B for steering. However, in apparatus 40B, the steering mechanism 60B is modified to include two steering rearward bars 63B each connected to one of the opposing steering driver arms 55B and to one of the opposing arms on the T-shaped steering leverage bracket 62B (FIG. 34). The steering mechanism 60B includes a pivot block 90B that supports the T-shaped leverage bracket 62B (FIG. 34), with an opening 91B in the pivot block 90B limiting an angular movement of the bracket 62B to thus limit a maximum angle that the front wheels 48B can be turned.

Figure 2:
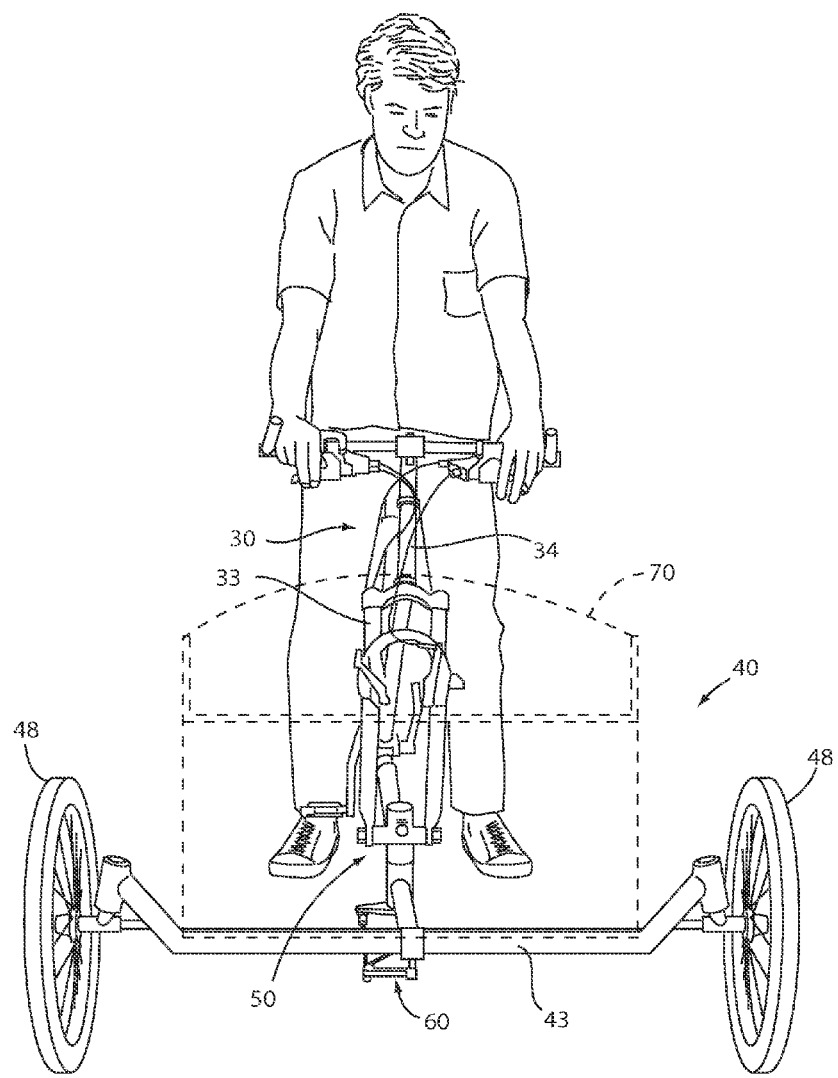
Figure 3:
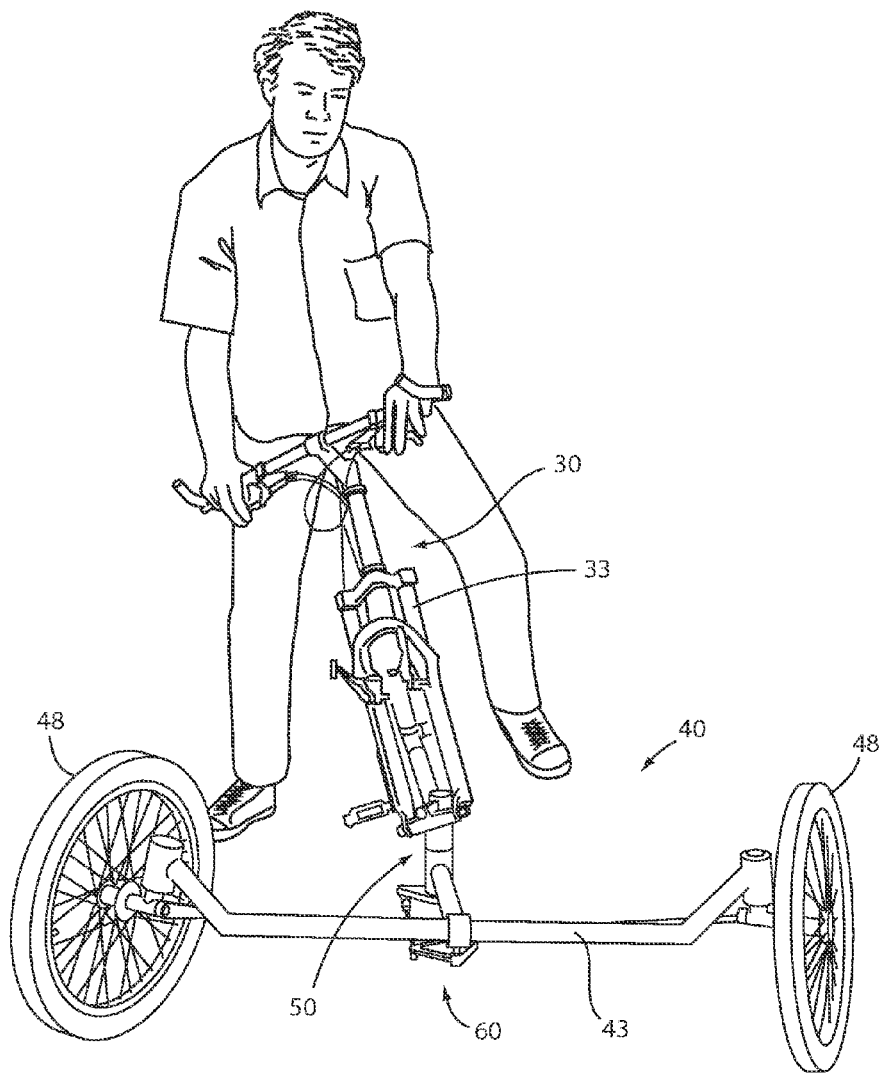
FIGS. 3-4 are front views showing right-tilt and left-tilt cornering of the apparatus in FIG. 1.
Figure 4:
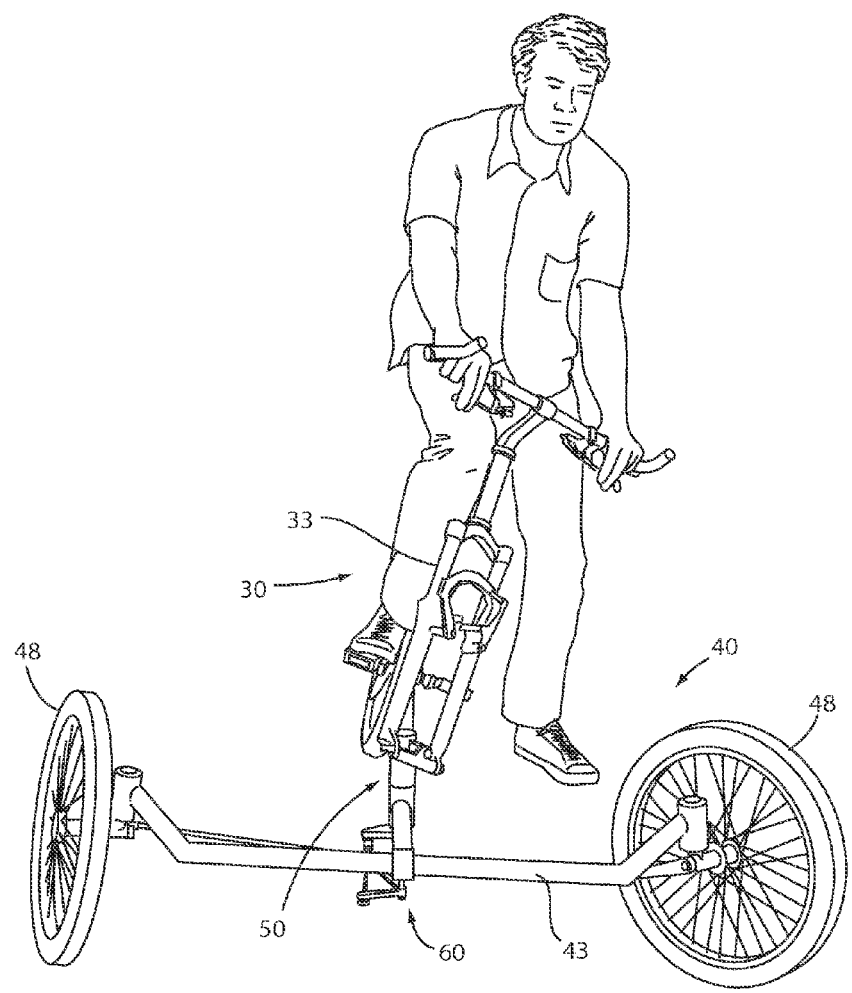
Figure 5:
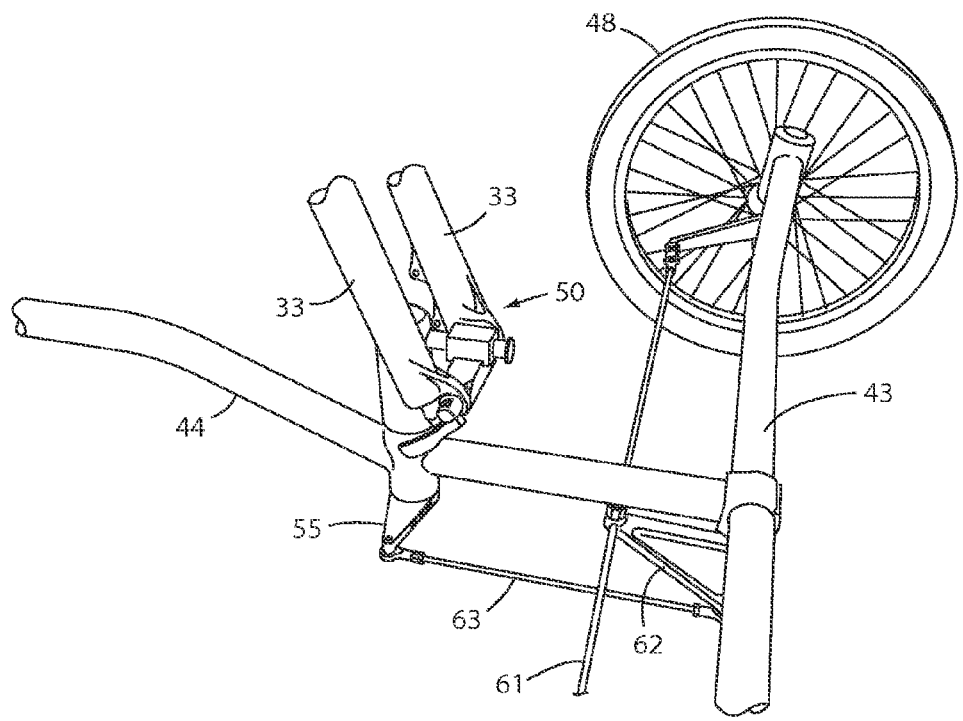
FIGS. 5, 5A, 6 are enlarged perspective side views of the gimbal assembly of the subframe connecting the front forks of the existing bicycle to the steering mechanism of the apparatus, FIG. 5A being identical to FIG. 5, but also including arrows showing related movement of components.
Figure 5A:
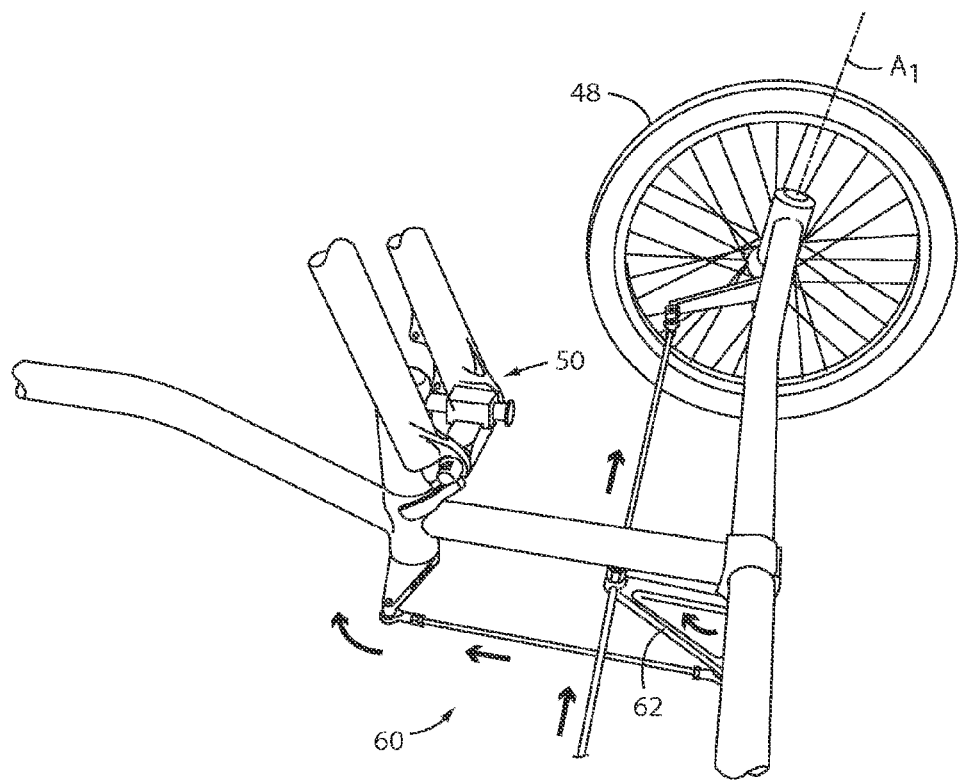
Figure 6:
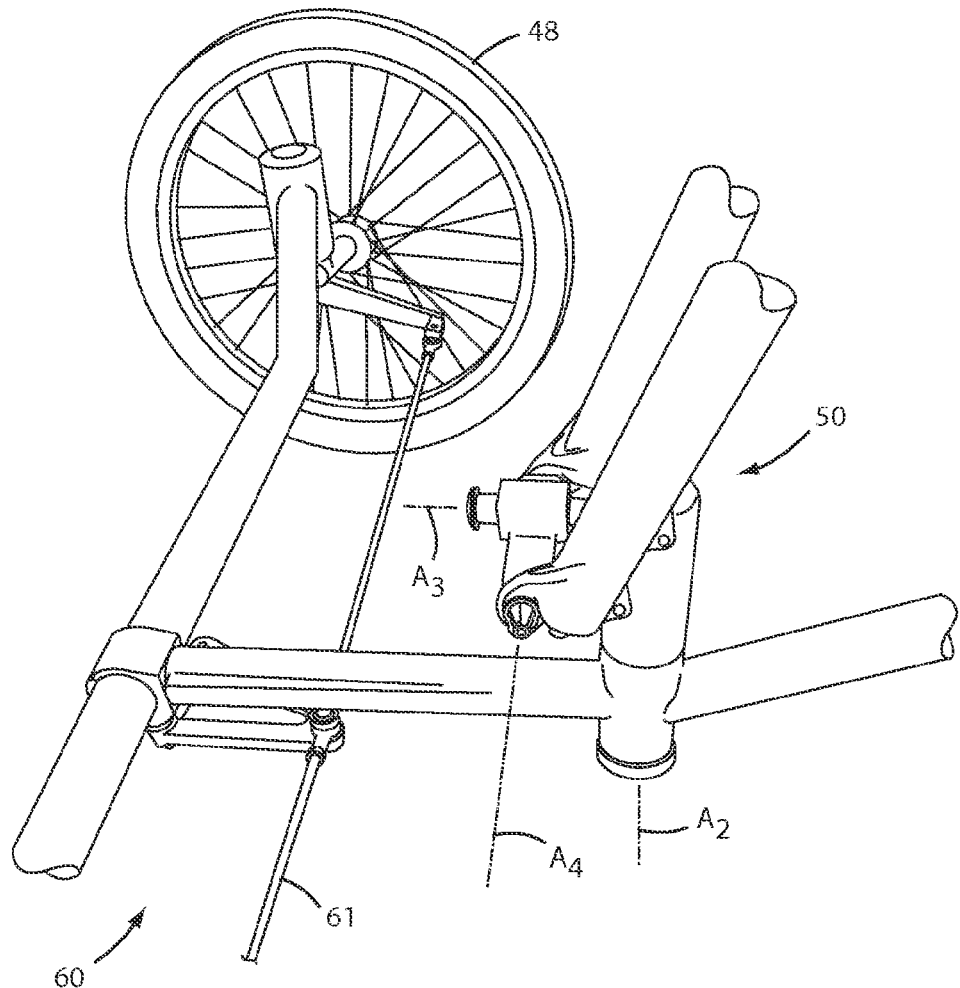
Figure 7:
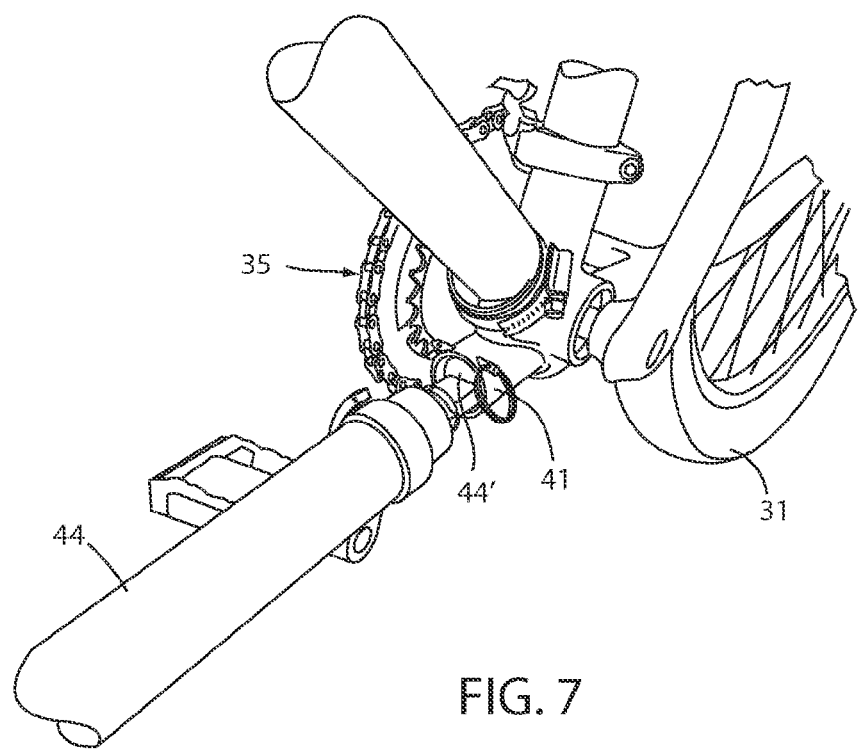
FIGS. 7, 8 are enlarged perspective views of the T-shaped subframe connection to the primary frame in FIG. 1.
Figure 8:
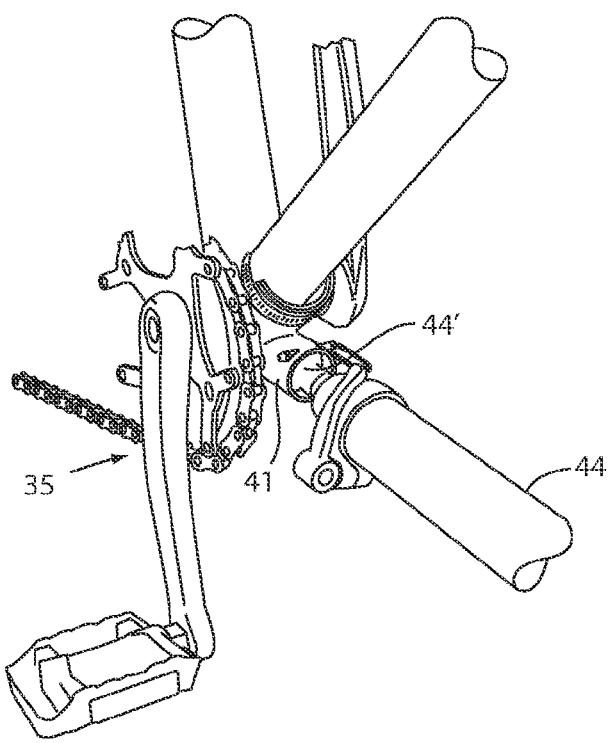
Figure 9:
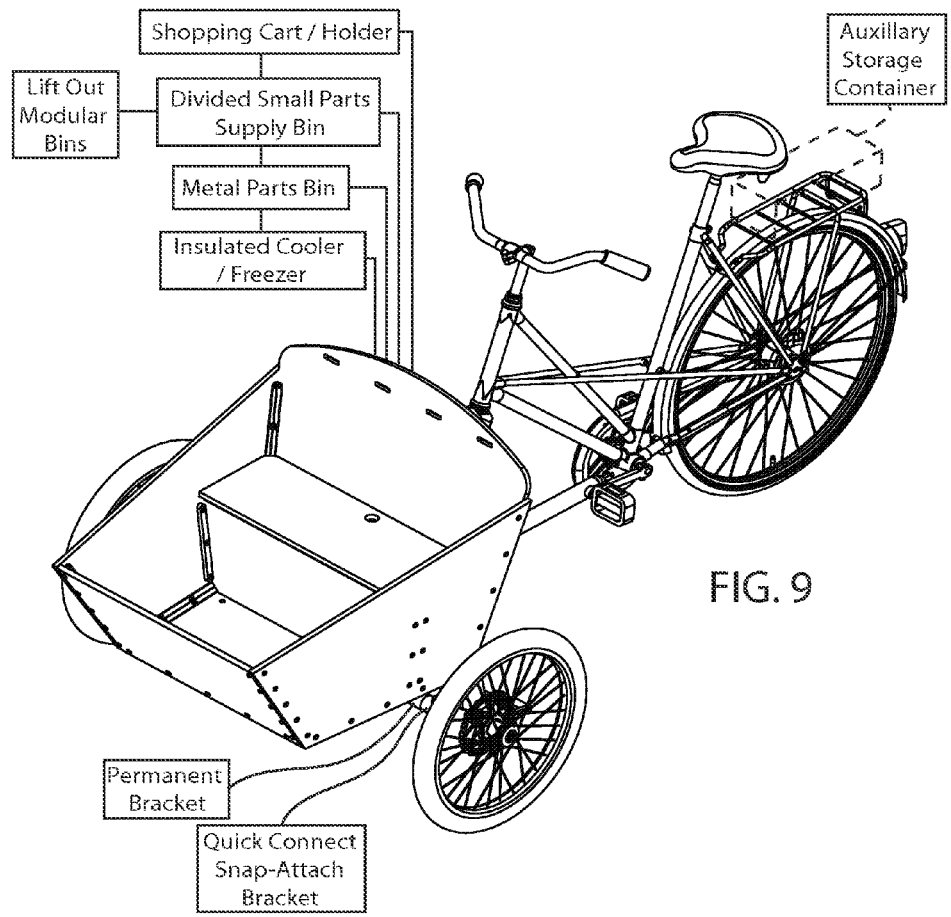
Figure 10:
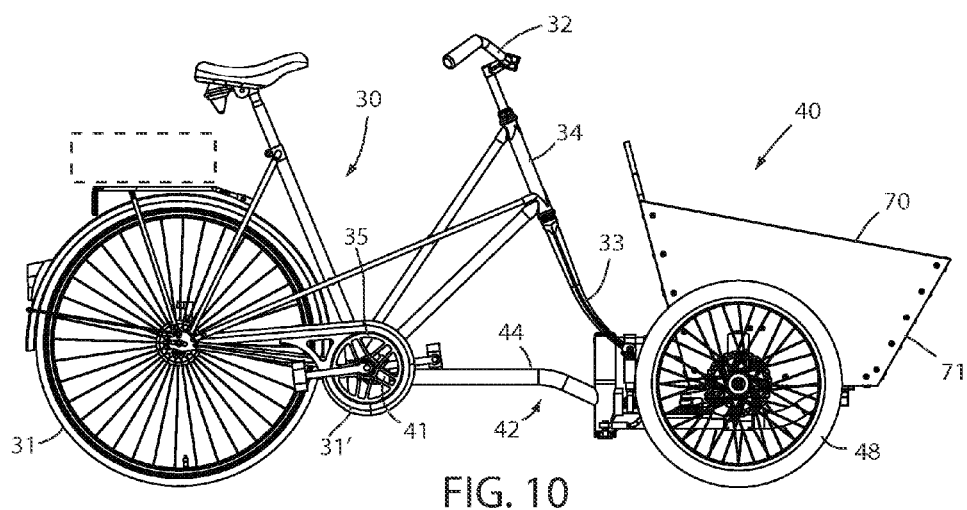
Figure 19:
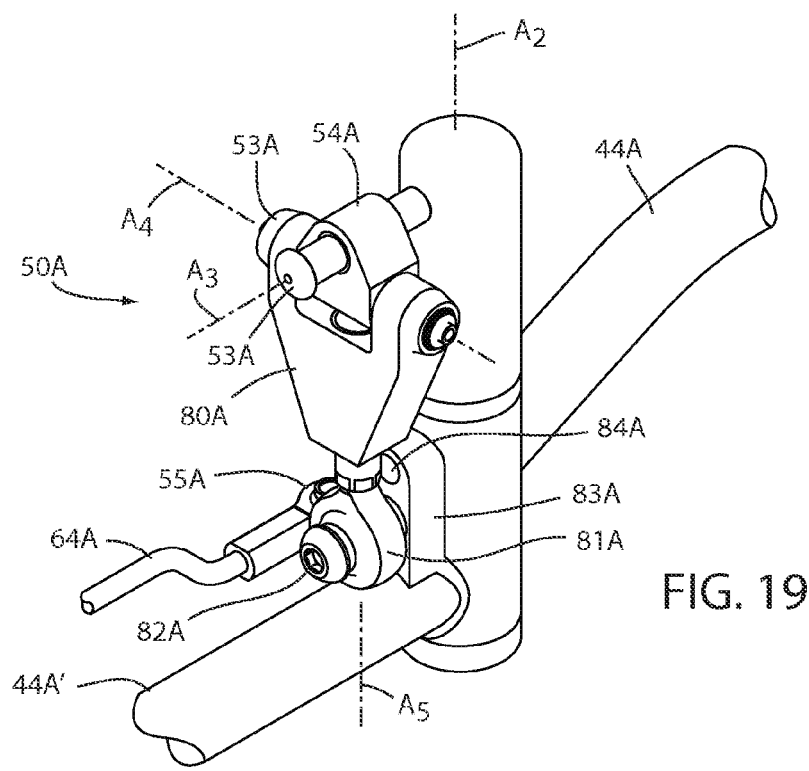
FIG. 19 is a perspective view of a modified gimbal assembly similar to FIG. 16 but with a yoke stabilizer.
Figure 37:
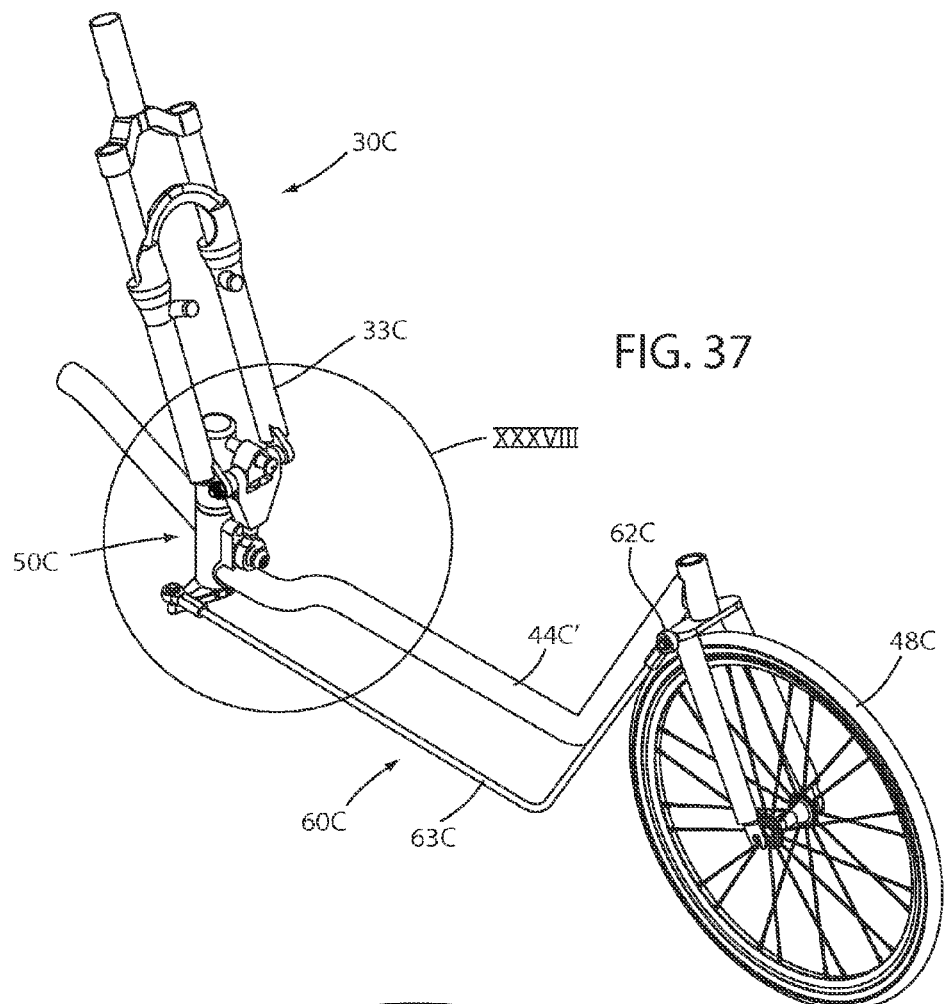
FIG. 37 is a fragmentary perspective view of the single-bar subframe of FIG. 36 and showing the front forks of a bicycle connected to the subframe.
Figure 38:
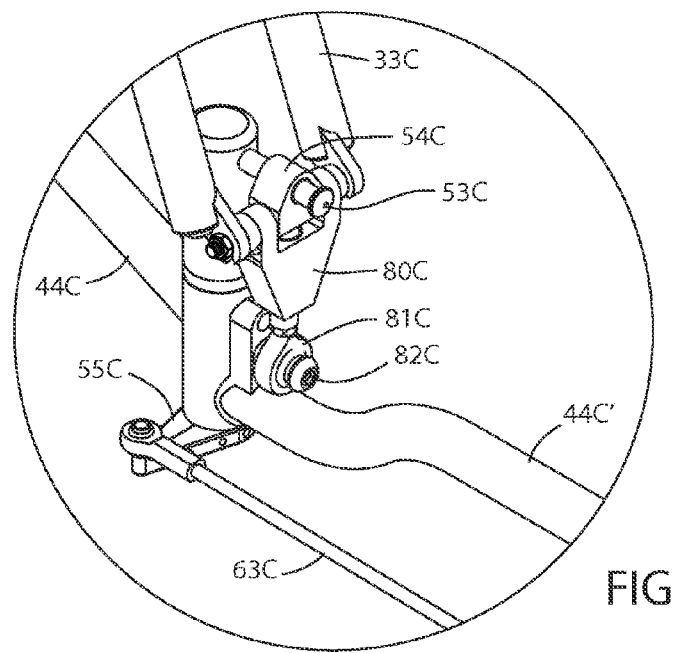
FIG. 38 is an enlarged view of the circled area XXXVIII in FIG. 37.
Figure 39:
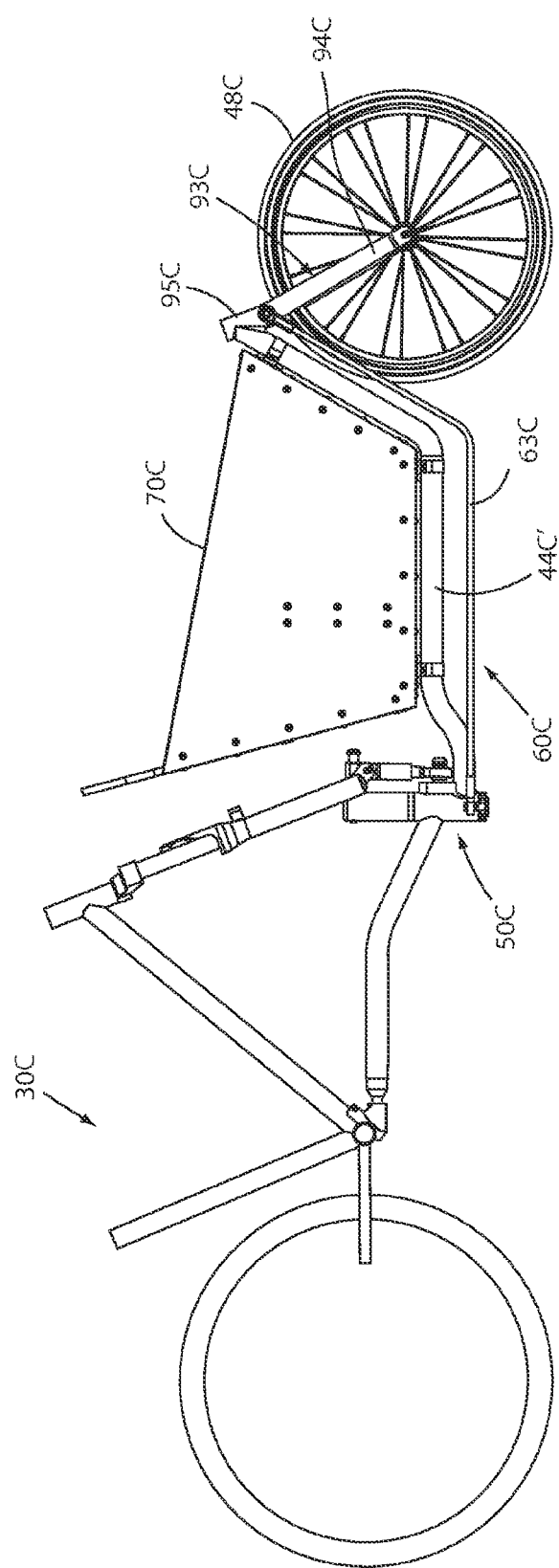
FIG. 39 is a side view of FIG. 35.
Figure 40:
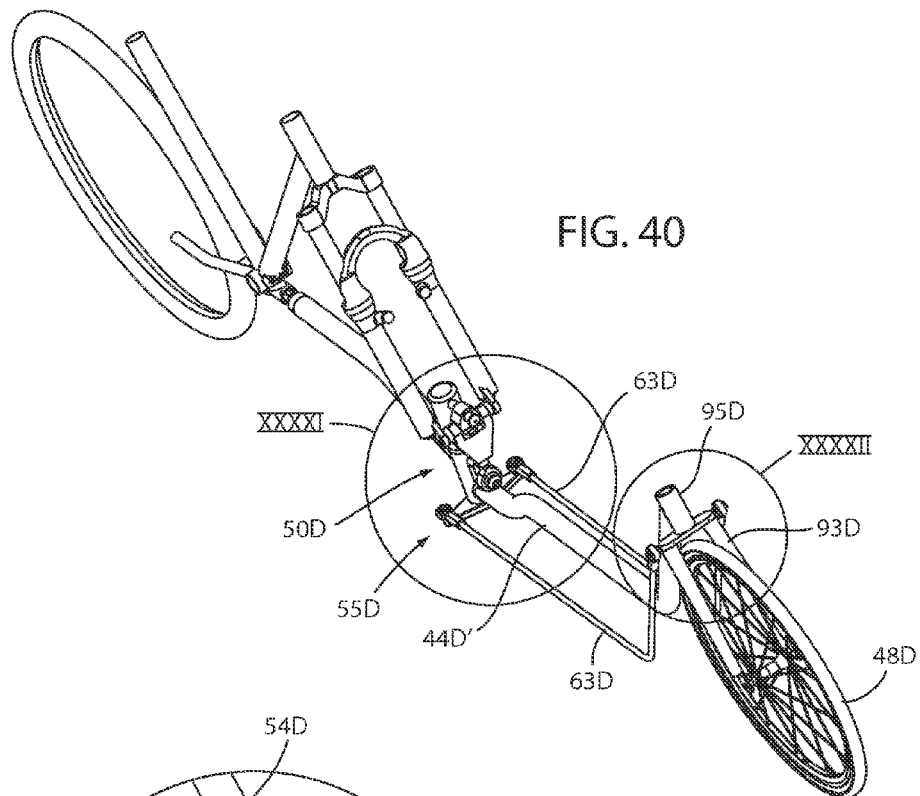
FIG. 40 is a perspective view of another apparatus modified embodying the present invention, including a single-bar subframe assembly like FIG. 35 but including two driving steering rearward bars.
Figure 41:
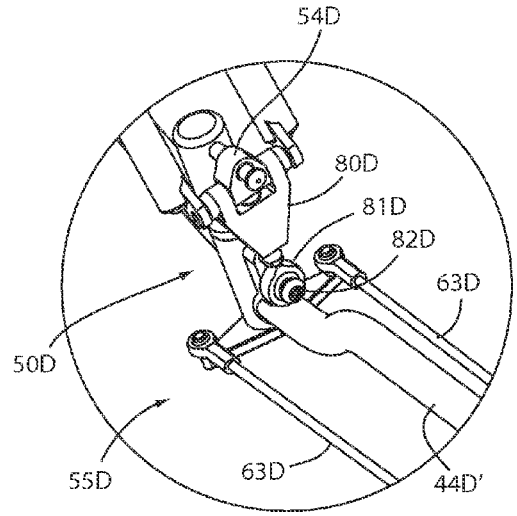
FIGS. 41-42 are enlarged views of the circled areas XXXXI and XXXXII in FIG. 40.
Figure 42:
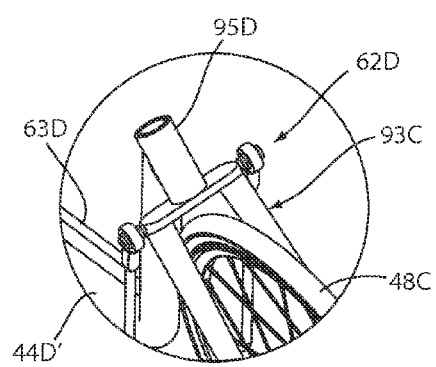
Figure 45:
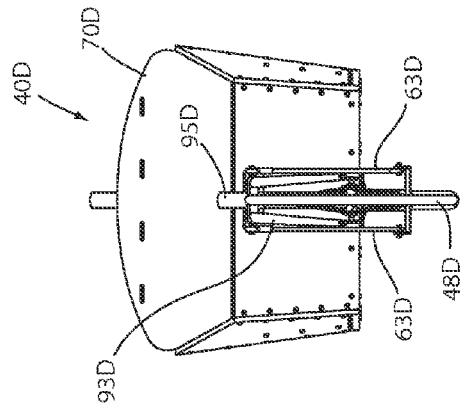
FIGS. 43-45 are side, bottom and front views of the bicycle apparatus shown in FIG. 40.
Figure 43:
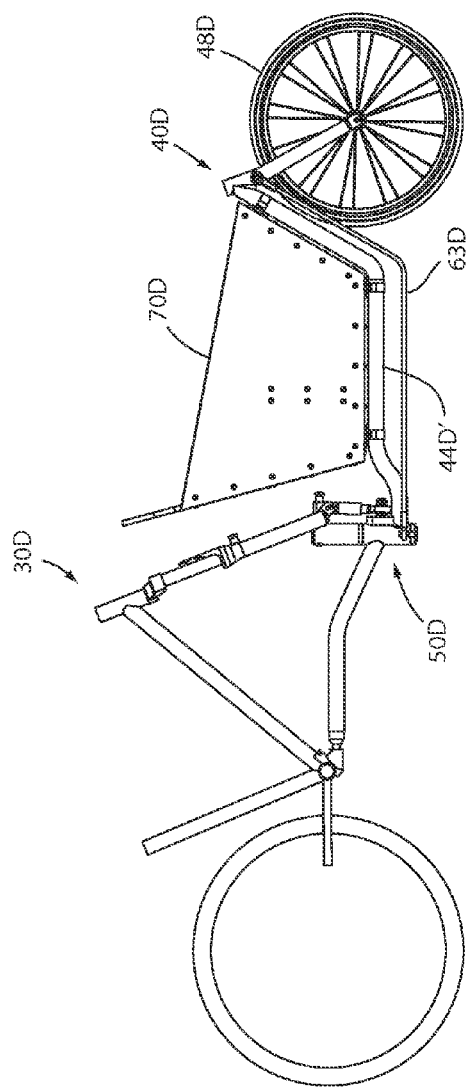
Figure 44:
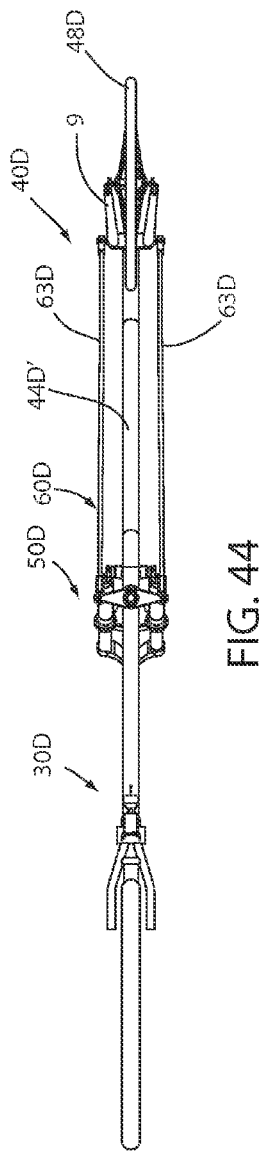

A modified apparatus 40C is shown in FIGS. 35-39 and includes a steering mechanism 60C with one steering rearward bar 63C and one front wheel 48C. The modified apparatus 40C includes components similar to apparatus 40A including a gimbal assembly 50C (FIG. 38) like gimbal assembly 50A (FIG. 19). However, the subframe assembly 42C includes a single forwardly extending frame bar 44C' and does not include a cross frame bar 43 (FIG. 2). The subframe assembly 42C includes a fork replicator component 93C (also called "secondary front forks" herein) pivoted to a front bearing tube 95C on a front end of the frame bar 44C'. The fork replicator component 93C includes down-facing forks 94C on its lower end supporting an axle that in turn supports the single front wheel 48C. The steering rearward bar 63C is shaped to extend generally parallel a shape of the frame bar 44C' (see FIGS. 37 and 39), and extends from the steering driver arm 55C on the gimbal assembly 50C to a side of a steering leverage bracket 62C near a top of the fork replicator component 93C (FIG. 37).

A modified apparatus 40D is shown in FIGS. 40-44 and includes a steering mechanism 60D with two steering rearward bars 63D and one front wheel 48D. The modified apparatus 40D includes components similar to apparatus 40C including a gimbal assembly 50D (FIG. 38) like gimbal assembly 50C (FIG. 19). However, the steering mechanism 60D includes two steering rearward bars 63D extending from opposing arms 55D on the gimbal assembly 50D to opposing sides of the bracket 62D on the fork simulating component 93D.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An apparatus comprising:
   a primary frame, a rear wheel, and a steering mechanism including handle bars connected to front forks and journaled to the primary frame for turning the front forks;
   a pivot adapter attached to the primary frame;
   a subframe engaging the pivot adapter for rotation and extending side-to-side and including an axle support;
   a front axle assembly on the subframe, the front axle assembly including a king pin rotatably engaging the associated axle support and including a stub axle for supporting a front wheel and including a steering control arm;

an assembly on the subframe, the assembly including a front-fork-engaging member and a steering driver arm; and a steering mechanism including a steering bar operably connected between the steering control arms and the assembly so that upon rotation of the handle bars and front forks the steering driver arm moves the steering control arms to steer the front wheel;

wherein the assembly includes a vertical mount attached to the subframe, an assembly vertical axis member rotatably mounted on the vertical mount, a slider slidably and rotatably mounted to an assembly horizontal axis member extending from the vertical mount, the slider including arms attached to the front forks.

2. The cycle apparatus defined in 1, wherein the assembly includes a stabilizer yoke attached to the slider that produces controlled rotation of the slider.

3. A cycle apparatus comprising:

a primary frame, a rear wheel on the primary frame, and steerable handle bars journaled to the primary frame and adapted for steering;

a subframe operably connected to the primary frame so that the primary frame can tilt relative to the subframe, the subframe having at least one steerable front wheel; and a steering assembly attached to the primary frame and to the subframe including a steering control connecting the at least one steerable front wheel to the steerable handle bars, and having a yoke, a yoke stabilizer, a yoke stabilization bolt, and a fork slider connected to the yoke;

whereby a rider can motivate the primary frame and tilt the primary frame when turning corners and simultaneously steer the at least one front wheel without tilting the subframe.

* * * * *